(12) United States Patent
Nakano

(10) Patent No.: US 9,785,756 B2
(45) Date of Patent: Oct. 10, 2017

(54) RESTRICTION OF USE THAT EXCEEDS A PERSONAL USE RANGE WHEN TRANSMITTING A CONTENT ACCUMULATED AT HOME VIA AN EXTERNAL NETWORK

(71) Applicant: SONY CORPORATION, Tokyo (JP)

(72) Inventor: Takehiko Nakano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 14/767,664

(22) PCT Filed: Jan. 20, 2014

(86) PCT No.: PCT/JP2014/051014
§ 371 (c)(1),
(2) Date: Aug. 13, 2015

(87) PCT Pub. No.: WO2014/136480
PCT Pub. Date: Sep. 12, 2014

(65) Prior Publication Data
US 2016/0004846 A1     Jan. 7, 2016

(30) Foreign Application Priority Data
Mar. 8, 2013   (JP) .................................. 2013-047006

(51) Int. Cl.
*G06F 21/00* (2013.01)
*G06F 21/10* (2013.01)
(Continued)

(52) U.S. Cl.
CPC ............ *G06F 21/10* (2013.01); *H04L 63/061* (2013.01); *H04L 63/0869* (2013.01);
(Continued)

(58) Field of Classification Search
CPC ...................................................... H04L 63/061
See application file for complete search history.

(56) References Cited

U.S. PATENT DOCUMENTS

| 7,333,876 B2 * | 2/2008 | Knight, Jr. ......... | G05B 23/0216 118/663 |
| 8,004,944 B2 * | 8/2011 | Kakimoto ............ | G11B 7/0045 369/47.1 |

(Continued)

FOREIGN PATENT DOCUMENTS

| JP | 2003-186778 A | 7/2003 |
| JP | 2044-180020 A | 6/2004 |

(Continued)

OTHER PUBLICATIONS

Extended European Search Report of EP Patent Application No. 14760030.8, issued on Oct. 5, 2016, 6 pages.

(Continued)

*Primary Examiner* — Ali Shayanfar
(74) *Attorney, Agent, or Firm* — Chip Law Group

(57) ABSTRACT

A communication apparatus includes a tuner, a content storage, and a controller that acquires content from the tuner, for one of providing the content to a terminal or recording the content to the content storage, and registers the terminal, in association with a registration date, to a home network. The terminal requests the content from outside the home network. The controller provides the content to the registered terminal based on a request, from the registered terminal, for the content, where the providing of the content to the registered terminal is based on the request, before an expiration date, for the content. The expiration date is based on the registration date of the registered terminal. The providing of the content to the registered terminal is restricted based on the request, after the expiration date, for the content.

12 Claims, 20 Drawing Sheets

Communication system 100

(51) Int. Cl.
*H04L 29/06* (2006.01)
*H04L 9/32* (2006.01)

(52) U.S. Cl.
CPC .... *H04L 63/108* (2013.01); *G06F 2221/2137* (2013.01); *H04L 9/3271* (2013.01)

(56) References Cited

U.S. PATENT DOCUMENTS

| | | | | |
|---|---|---|---|---|
| 8,010,792 B2* | 8/2011 | Tanaka | ............... | H04L 9/3273 713/168 |
| 2004/0158634 A1* | 8/2004 | Saito | ............... | H04L 12/2803 709/225 |
| 2004/0162870 A1* | 8/2004 | Matsuzaki | ............ | G06F 21/10 709/200 |
| 2006/0156390 A1* | 7/2006 | Baugher | ............ | H04L 63/0807 726/5 |
| 2006/0212722 A1* | 9/2006 | Ginter | ................ | G06F 21/10 713/193 |
| 2006/0245593 A1* | 11/2006 | Nakano | ............... | H04L 9/0838 380/277 |
| 2006/0265735 A1* | 11/2006 | Ohno | ............... | H04L 63/0428 726/2 |
| 2007/0162979 A1* | 7/2007 | Kamperman | ........ | G06F 21/10 726/27 |
| 2007/0192872 A1* | 8/2007 | Rhoads | ............... | G06F 3/017 726/26 |
| 2007/0245403 A1* | 10/2007 | Ginter | ................ | G06F 21/10 726/2 |
| 2007/0285714 A1* | 12/2007 | Hirayama | ........... | G06Q 30/02 358/1.15 |
| 2011/0293090 A1* | 12/2011 | Ayaki | ................ | H04L 9/0891 380/200 |
| 2013/0329719 A1* | 12/2013 | Chung | ............... | H04W 76/046 370/345 |
| 2014/0143607 A1* | 5/2014 | Vogt | ................ | G06F 11/079 714/43 |

FOREIGN PATENT DOCUMENTS

| | | |
|---|---|---|
| JP | 2004-234648 A | 8/2004 |
| JP | 2005-204094 A | 7/2005 |
| JP | 2007-164299 A | 6/2007 |
| JP | 2010-117832 A | 5/2010 |
| JP | 2010-160709 A | 7/2010 |
| JP | 2011-082952 A | 4/2011 |
| JP | 2011-197917 A | 10/2011 |
| JP | 2011-244165 A | 12/2011 |
| WO | 2006/006678 A1 | 1/2006 |
| WO | 2011/030520 A1 | 3/2011 |

OTHER PUBLICATIONS

Office Action for JP Patent Application No. 2015-504195, dated Feb. 21, 2017, 8 pages of Office Action.

* cited by examiner

US 9,785,756 B2

RESTRICTION OF USE THAT EXCEEDS A PERSONAL USE RANGE WHEN TRANSMITTING A CONTENT ACCUMULATED AT HOME VIA AN EXTERNAL NETWORK

TECHNICAL FIELD

The technique disclosed in the specification relates to a communication apparatus, a communication method, a computer program, and a communication system for encrypting and transmitting a content using a key shared according to a predetermined mutual authentication and key exchange (AKE) algorithm such as DTCP, more particularly, to a communication apparatus, a communication method, a computer program, and a communication system for transmitting, while suppressing a use exceeding a personal use range, contents accumulated at home via an external network.

BACKGROUND ART

It is comparatively easy to perform illicit operations such as a copy and falsification on a digitalized content. Especially in a remote access, there is a need for a mechanism for preventing illicit uses intervening in a content transmission while allowing individual and home uses of a content, that is, a mechanism for a copyright protection. As a standard technique for a digital content transmission protection, there is DTCP (Digital Transmission Content Protection) developed by DTLA (Digital Transmission Licensing Administrator).

In DTCP, an inter-apparatus authentication protocol used in a content transmission and a transmission protocol of an encrypted content are defined. To make it short, the restriction includes not transmitting, by a DTCP-conforming apparatus, a compressed content that can be easily handled outside the apparatus in an unencrypted state, performing a key exchange requisite for decrypting an encrypted content according to a predetermined mutual authentication and key exchange (Authentication and Key Exchange: AKE) algorithm, and limiting a range of apparatuses that perform a key exchange by an AKE command.

DTCP has originally been defined for a content transmission on a home network using IEEE1394 as a transmission channel. Recently, movements to distribute digital contents also in homes via an IP network as represented by DLNA (Digital Living Network Alliance) are fully in progress. In this regard, DTCP-IP (DTCP mapping to IP) obtained by porting the DTCP technique to an IP network is being developed.

For example, when a commercial content accumulated in a home server, such as a broadcast content and a movie, is to be remotely used from outside, prevention of a use exceeding a personal use range based on appropriate control is desired.

In current DTCP-IP (DTCP-IP Volume 1 Specification Revision 1.4), with an intention to limit a use of a content by a third person, a remote access to a home server is limited to a terminal registered in the server. Further, in registering a terminal in a home server, a round trip time (RTT) of a command is limited to 7 milliseconds maximum, and an upper limit is set to a hop count of an IP router.

For example, there is proposed a communication system in which, while it becomes possible to share a key for a remote access by canceling the limits of the RTT and TTL in an AKE procedure in a remote access, a preregistration to a server of a terminal to be remotely accessed, a remote access usage limit of a content, and a key supply count limit are imposed so as to restrict a remote access from an unspecified number of users (see, for example, Patent Document 1).

According to the current DTCP-IP standard, however, once the registration is made in the home server of the terminal, contents in the server can be continued to be used by a remote access without having to reregister from then on. Therefore, there is a problem that once a terminal of a third person is registered in the server, that third person can continue to use the contents in the server from then on.

Patent Document 1: Japanese Patent Application Laid-open No. 2011-82952

SUMMARY OF INVENTION

Problem to be Solved by the Invention

The technique disclosed in the specification aims at providing an excellent communication apparatus, communication method, computer program, and communication system that are capable of suitably suppressing a use exceeding a personal use range when a content accumulated at home is transmitted via an external network according to a predetermined mutual authentication and key exchange algorithm such as DTCP.

Means for Solving the Problem

The present disclosure has been made in view of the problem described above, and according to the technique according to claim 1, there is provided a communication apparatus, including:

a content acquisition section that acquires a content to be provided to a terminal or a content recording section that records the content to be provided to the terminal;

a terminal registration section that registers a terminal to which a content is to be provided; and a content provision section that controls provision of a content to the terminal based on a registration time and date of the terminal.

According to the technique according to claim 2, the communication apparatus according to claim 1 further includes an authentication and key sharing section that authenticates a terminal and shares an exchange key according to a predetermined mutual authentication and key exchange procedure. The content provision section provides a content encrypted using the exchange key to the terminal.

According to the technique according to claim 3, the authentication and key sharing section of the communication apparatus according to claim 2 performs mutual authentication and sharing of the exchange key with the terminal according to an authentication and key exchange (AKE) algorithm defined by DTCP-IP, and the terminal registration section registers the terminal according to a procedure defined by DTCP-IP.

According to the technique according to claim 4, the terminal registration section of the communication apparatus according to claim 1 registers the terminal in a home network, and the content provision section provides a content to the registered terminal accessing from an external network.

According to the technique according to claim 5, the terminal registration section of the communication apparatus according to claim 1 manages an expiration date obtained by adding a first predetermined period to the registration time and date of the terminal together with terminal information, and the content provision section restricts provision of a content to the terminal that has exceeded the expiration date.

According to the technique according to claim 6, the terminal registration section of the communication apparatus according to claim 1 manages an expiration date obtained by adding a first predetermined period to the registration time and date of the terminal together with terminal information, and the content provision section restricts provision of a content to the terminal that has exceeded the expiration date.

According to the technique according to claim 7, the content provision section of the communication apparatus according to claim 1 provides a content while exempting a restriction based on the registration time and date for a predetermined number of terminals registered in the terminal registration section.

According to the technique according to claim 8, in the communication apparatus according to claim 1, a terminal for which a restriction based on the registration time and date is to be exempted is set for each content or content group, and the content provision section provides, irrespective of the registration time and date, a content to the terminal for which the restriction based on the registration time and date has been exempted regarding a content to be provided or a content group including the content.

According to the technique according to claim 9, the content recording section of the communication apparatus according to claim 8 records the terminal for which the restriction based on the registration time and date has been exempted regarding a content to be provided or a content group including the content into metadata of the content or content group.

According to the technique according to claim 10, in the communication apparatus according to claim 5, a terminal for which a restriction based on the expiration date is to be exempted is set for each content or content group. The content provision section provides, irrespective of the expiration date, a content to the terminal for which the exemption has been set regarding a content to be provided or a content group including the content.

According to the technique according to claim 11, in the communication apparatus according to claim 6, a terminal for which a restriction based on the limit time and date is to be exempted is set for each content or content group. The content provision section provides, irrespective of the limit time and date, a content to the terminal for which the exemption has been set regarding a content to be provided or a content group including the content.

According to the above technique according to claim 12, there is provided a communication method, including:

a content acquisition step of acquiring a content to be provided to a terminal or a content recording step of recording the content to be provided to the terminal in a content recording section;

a terminal registration step of registering a terminal to which a content is to be provided; and a content provision step of providing, to the terminal, a content acquired in the content acquisition step or a content recorded in the content recording step while placing a restriction based on a registration time and date of the terminal.

According to the above technique, there is provided a computer program described in a computer-readable format to cause a computer to function as:

a content acquisition section that acquires a content to be provided to a terminal or a content recording section that records the content to be provided to the terminal;

a terminal registration section that registers a terminal to which a content is to be provided; and a content provision section that controls provision of a content to the terminal based on a registration time and date of the terminal.

The computer program according to the above technique defines a computer program described in a computer-readable format so as to realize predetermined processing on a computer. In other words, by installing the computer program according to the above technique in a computer, cooperative operations are exerted on the computer, and thus operational effects that are the same as those of the communication apparatus according to claim 1 can be obtained.

According to the above technique, there is provided a communication apparatus, including:

an input section to which operation information of a user is input;

a registration request section that makes a registration request to a server managing a registration time and date;

a content request section that requests a content to the server according to the operation information input to the input section; and a content reproduction section that is permitted by the server to reproduce, in response to the request of a content, the content under a restriction based on the registration time and date.

According to the above technique, the content reproduction section of the communication apparatus is restricted to reproduce a content from the server after an expiration date obtained by adding a first predetermined period to the registration time and date with respect to the server.

According to the above technique, the content reproduction section of the communication apparatus is restricted to reproduce a content that has been acquired or recorded by the server after a time and date obtained by adding a second predetermined period to the registration time and date with respect to the server.

According to the above technique, the content reproduction section of the communication apparatus is capable of reproducing a content from the server without placing a restriction based on the registration time and date with respect to the server when the registration is made within a predetermined number.

According to the above technique, there is provided a communication method, including:

an input step of inputting operation information of a user;

a registration request step of making a registration request to a server managing a registration time and date;

a content request step of requesting a content to the server according to the operation information input to the input section; and a content reproduction step of permitting by the server to reproduce, in response to the request of a content, the content under a restriction based on the registration time and date.

According to the above technique, there is provided a computer program described in a computer-readable format to cause a computer to function as:

an input section to which operation information of a user is input;

a registration request section that makes a registration request to a server managing a registration time and date;

a content request section that requests a content to the server according to the operation information input to the input section; and a content reproduction section that is permitted by the server to reproduce, in response to the request of a content, the content under a restriction based on the registration time and date.

The computer program according to the above technology defines a computer program described in a computer-readable format so as to realize predetermined processing on a computer. In other words, by installing the computer program in a computer, cooperative operations are exerted on the computer, and thus operational effects that are the same as those of the communication apparatus according to the above technology can be obtained.

According to the above technique, there is provided a communication system, including:

a terminal that requests a content; and a server that controls, as well as register a terminal to which a content is to be provided, provision of a content to the terminal based on a registration time and date.

It should be noted that the "system" used herein refers to a plurality of logically-grouped apparatuses (or functional modules that realize specific functions), and whether the apparatuses or functional modules are provided in a single casing is irrelevant.

Effect of the Invention

According to the technique disclosed in the specification, it is possible to provide an excellent communication apparatus, communication method, computer program, and communication system that are capable of suitably suppressing a use exceeding a personal use range when transmitting a content accumulated at home via an external network according to a predetermined mutual authentication and key exchange algorithm such as DTCP.

According to the technique disclosed in the specification, by restricting a remote access to the server at home from a terminal based on the registration time and date of the terminal with respect to the server, it is possible to prevent a content from being used continuously by a third person once registered in the server and suitably suppress a use of a content that has exceeded a personal use range.

Further, according to the technique disclosed in the specification, by permitting a remote access to a content in the server from the terminal only for a first predetermined period from the registration time and date of the terminal with respect to the server, that is, by inhibiting the remote access when the first predetermined period elapses since the registration time and date, a use of a content exceeding a personal use range by a third person can be suppressed.

Further, according to the technique disclosed in the specification, by restricting contents that the terminal is capable of using to those recorded before a second predetermined period from the registration time and date of the terminal with respect to the server, a use of a content exceeding a personal use range by a third person can be suitably suppressed.

Further, according to the technique disclosed in the specification, by exempting the restriction of a remote access based on the registration time and date with respect to the server for a predetermined number of terminals, a convenience of a use of a content within a personal use range can be secured.

Further, according to the technique disclosed in the specification, by setting the terminal for which the restriction of a remote access based on the registration time and date with respect to the server is to be exempted for each content or content group, a convenience of a use of a content within a personal use range by a plurality of terminals of family members can be secured, for example.

These and other objects, features, and advantages of the technique disclosed in the specification will become more apparent in light of the following embodiment and accompanying drawings.

MODE FOR CARRYING OUT THE INVENTION

Hereinafter, an embodiment of the technique disclosed in the specification will be described with reference to the drawings.

A. System Structure

Figure 1:
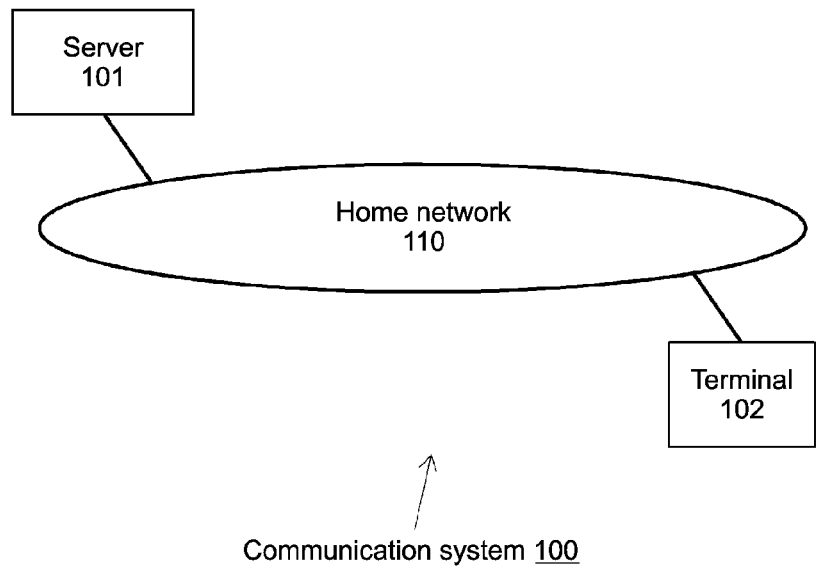
FIG. 1 is diagram schematically showing a structural example of a communication system 100 to which the technique disclosed in the specification is applied.

FIG. 1 schematically shows a structural example of a communication system 100 to which the technique disclosed in the specification is applied. A communication system 100 shown in the figure is constituted of a server 101 and a terminal 102 connected to a home network 110 set in a home. Although the server and terminal are illustrated one each for simplification in the figure, two or more servers and terminals may be provided on the home network 110.

The server 101 stores contents to be provided to the terminal 102. The server 101 stores, for example, broadcast contents received by digital terrestrial broadcast, commercial contents such as a movie read from a recording medium (not shown) such as a Blu-ray disc, and contents downloaded from a content server (not shown) on the Internet.

A DTCP technique is used for a content transmission between the server 101 and the terminal 102 via the home network 110. Therefore, the terminal 102 that wishes to use a content can request, after mutual authentication and key sharing with the server 101, a content stored in the server 101 according to a predetermined mutual authentication and key exchange (Authentication and Key Exchange: AKE) algorithm. The server 101 encrypts and transmits the requested content using a shared key. The server 101 that provides a content corresponds to a Source device, and the terminal 102 that uses a content corresponds to a Sink device.

It should be noted that when the terminal 102 is to access the server 101 from outside the home network 110, the terminal 102 needs to be preregistered in the server 101 on the home network 110.

Figure 2:
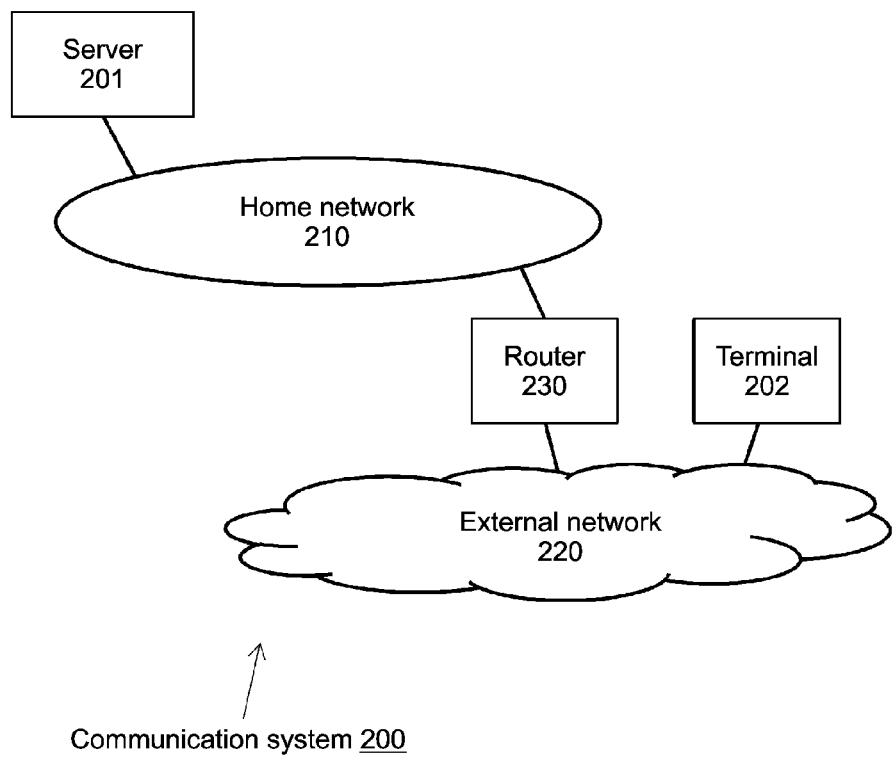
FIG. 2 is a diagram schematically showing another structural example of a communication system 200 to which the technique disclosed in the specification is applied.

FIG. 2 schematically shows another structural example of a communication system 200 to which the technique disclosed in the specification is applied. The communication system 200 shown in the figure is constituted of a server 201 connected to a home network 210 set in a home and a terminal 202 connected to an external network 220 such as the Internet. The home network 210 and the external network 220 are mutually connected via a router 230 according to an IP (Internet Protocol) protocol. Although the server and terminal are illustrated one each for simplification in the figure, two or more servers may be provided on the home network 210, a terminal may be connected also to the home network 210, and two or more terminals may be connected to the external network 220.

The server 201 stores contents to be provided to the terminal 202, such as a broadcast content and a commercial content. Further, a DTCP-IP technique is used for a content transmission between the server 201 and the terminal 202 via the home network 210 and the external network 220. Therefore, the terminal 202 that wishes to use a content needs to be preregistered in the server 201 on the home network 210 (described above). Further, the terminal 202 can request, after mutual authentication and key sharing with the server 201, a content stored in the server 201 via an IP network constituted of the home network 210 and the external network 220. The server 201 encrypts and transmits the requested content using a shared exchange key. The server 201 that provides a content corresponds to the Source device, and the terminal 202 that uses a content corresponds to the Sink device.

Figure 3:
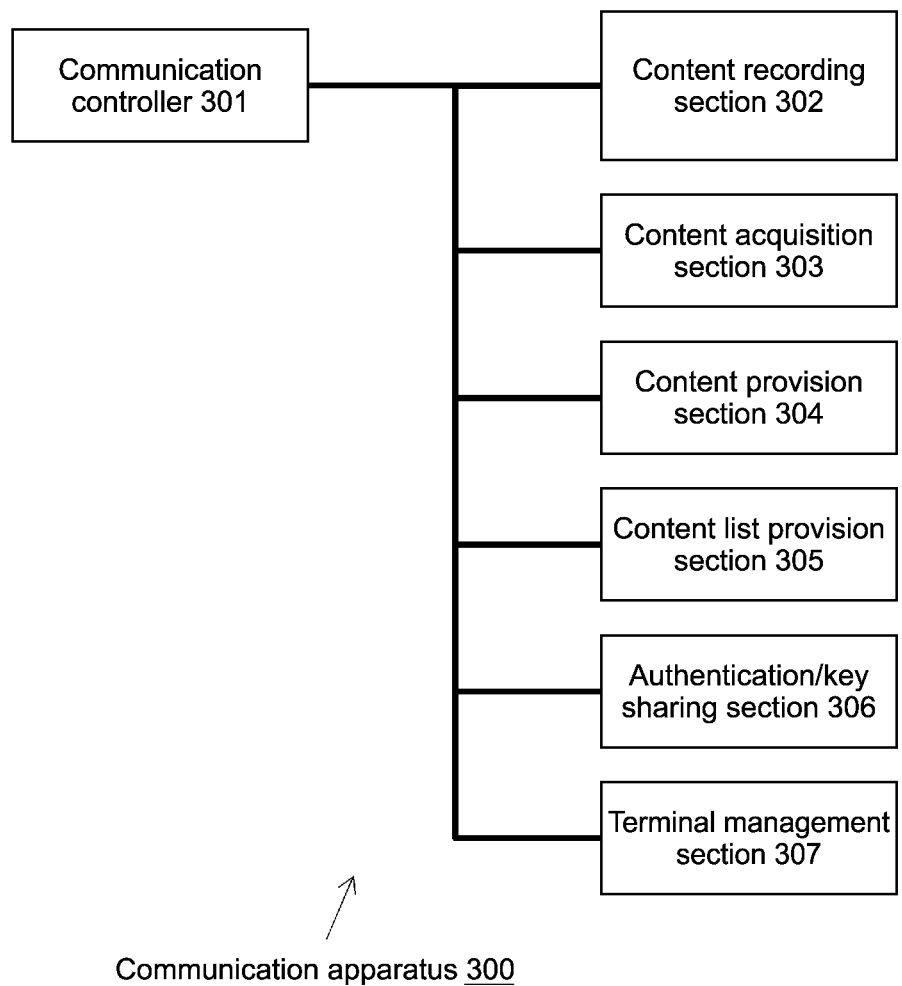
FIG. 3 is a diagram schematically showing a functional structure of a communication apparatus 300 that operates as servers 101 and 201 in FIGS. 1 and 2.

FIG. 3 schematically shows a functional structure of a communication apparatus 300 that operates as the servers 101 and 201 (i.e., Source devices) in FIGS. 1 and 2.

A communication controller 301 collectively controls entire operations of the communication apparatus 300 as well as control communication operations made via the home network and the external network. Moreover, the communication controller 301 includes an interface for connecting with an external network (or for digital output of content), such as HDMI (registered trademark) (High Definition Multimedia Interface) and USB (Universal Serial Bus), and can be connected to a recording/reproduction apparatus such as a hard disk apparatus and a Blu-ray disc apparatus.

A content recording section 302 records contents to be provided to the terminal via the home network and the external network. Regarding the contents recorded in the content recording section 302, a recording time and date and an access time and date are stored under a general file system management.

In this embodiment, a restriction of a remote access is set for each content recorded in the content recording section 302, or a plurality of contents are grouped so that the restriction of a remote access is set for each content group, the details of which will be described later. The content recording section 302 also records metadata of each content or content group.

A content acquisition section 303 acquires a content to be provided to the terminal. The content acquisition section 303 is constituted of, for example, a digital terrestrial broadcast tuner and acquires broadcast contents. The content acquisition section 303 in this case is based on a specification defined by ARIB (Association of Radio Industries and Businesses), for example. The content acquisition section 303 includes, for example, a reception function of all or a part of segments of broadcast channels, an EPG (Electronic Program Guide) function (program search, program information display, and timer recording of program), a copy control function based on an HDCP (High-bandwidth Digital Content Protection) specification or the like, and a content protection function for limitedly receiving a broadcast content or encrypting the received broadcast content when externally outputting it.

The content acquisition section 303 is constituted of a medium reproduction apparatus for a Blu-ray disc and the like and reads commercial contents such as a movie from a medium. Further, the content acquisition section 303 is constituted of a browser and the like and downloads non-free or free contents from a content server (not shown) on the Internet. The content acquisition section 303 may record the acquired content in the content recording section 302 as necessary. The content acquisition section 303 may also acquire a content to be provided to the terminal from the content recording section 302.

An acquisition time and date of a broadcast content, a commercial content, and the like is a current time and date that the content acquisition section 303 receives a broadcast content or reads out a commercial content. An acquisition time and date of a content in the content recording section 302 is a recording time and date of a content and is managed by a file system and the like. This embodiment has a feature that the provision of a content is restricted based on the acquisition time and date or recording time and date of a content with respect to the terminal that performs a remote access, the details of which will be described later.

A content provision section 304 provides, in response to a request from the terminal, a content acquired by the content acquisition section 303 to the terminal. The content provision section 304 transmits a content to the terminal using, for example, an HTTP (Hypet Text Transfer Protocol) protocol. The content provision section 304 encrypts the content to be transmitted using an exchange key shared with the terminal by an authentication/key sharing section 306. When the terminal requests a content by a remote access from the external network, the terminal needs to be preregistered in a terminal management section 307. This embodiment has a feature that the content provision section 304 restricts the provision of a content based on the registration time and date or the content acquisition time and date with respect to the terminal that performs the remote access, the details of which will be described later.

A content list provision section 305 provides, in response to a request from the terminal, for example, a list of contents that can be provided to the terminal and specific information thereof to the terminal. As can be understood from the descriptions above, contents that the servers 101 and 201 can provide to the terminal are a broadcast content received by the content acquisition section 303, a commercial content read out from a medium, and a content already recorded in the content recording section 302. Applied to the provision of a content list is a CDS (Content Directory Service) function for delivering a content list and specific information of contents in a hierarchized form, the function being defined by UPnP (Universal Plug and Play) as a base of DLNA, for example. This embodiment has a feature that the provision of a content is restricted based on the registration time and date or content acquisition time and date with respect to the terminal that performs a remote access, the details of which will be described later.

The authentication/key sharing section 306 performs mutual authentication and exchange key sharing for a content encryption with a terminal as a content request source according to an authentication and key exchange (AKE) algorithm defined by DTCP-IP. The authentication/key sharing section 306 shares a remote access exchange key $K_R$ with the terminal requesting a content by a remote access from the external network (to be described later).

The terminal management section 307 manages information on the terminal requesting a content. The terminal management section 307 manages, as well as carry out preregistration processing with respect to the terminal that uses a content by a remote access from the external network, information of the terminal as "remote sink registry" and "RAC (Remote Access Connection) registry", the details of which will be described later. The use of a content is to be restricted within a personal use range. This embodiment has a feature that the use of a content is restricted within a personal use range by restricting the provision of a content based on the registration time and date and the content acquisition time and date with respect to the terminal that performs the remote access, the details of which will be described later.

It should be noted that the functional blocks 303 to 307 described above can also be realized as an application program that the communication controller 301 executes on a higher level than an operating system and a TCP/IP protocol. This type of application program can be delivered from a predetermined download site on a wide area network such as the Internet and is used after being downloaded in a CE (Consumer Electronics) apparatus such as a digital broadcast tuner and a TV receiver and a multifunctional terminal such as a smartphone.

Figure 26:
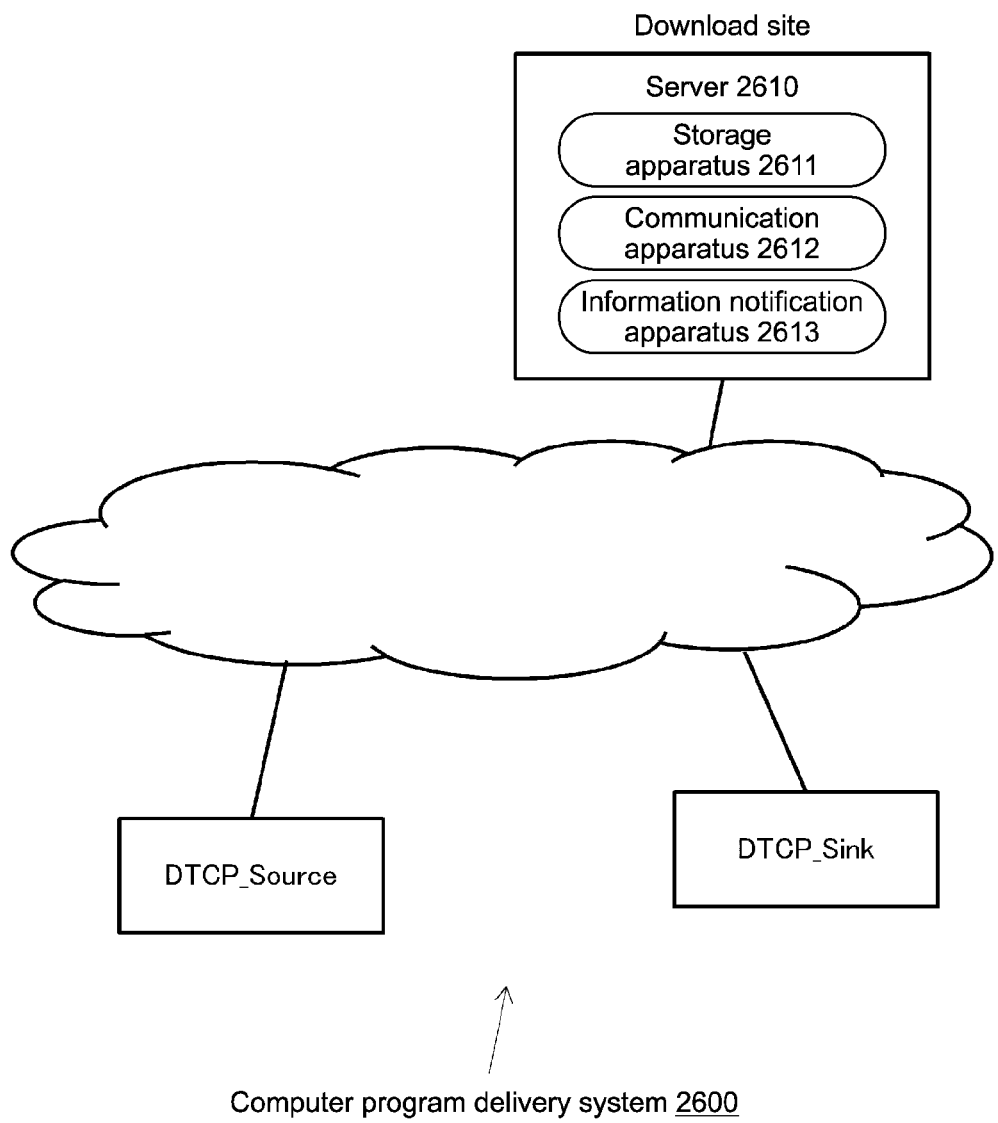
FIG. 26 is a diagram showing a structure of a computer program delivery system 2600.

Such a download site is constituted of, for example, a server 2610 including a storage apparatus 2611 that stores a computer program and a communication apparatus 2612 that permits the download upon receiving a download request for a computer program (see FIG. 26), and structures a computer program delivery system 2600 together with a client apparatus that installs the downloaded computer program (DTCP_Source or DTCP_Sink). This type of server also includes an information notification apparatus 2613 that notifies information indicating a name of a computer program in response to the computer program download request from the client. The information notification apparatus 2613 notifies, together with a name of the computer program, information indicating that the computer program is an application for providing a commercial content recorded at home to a remote terminal.

Figure 4:
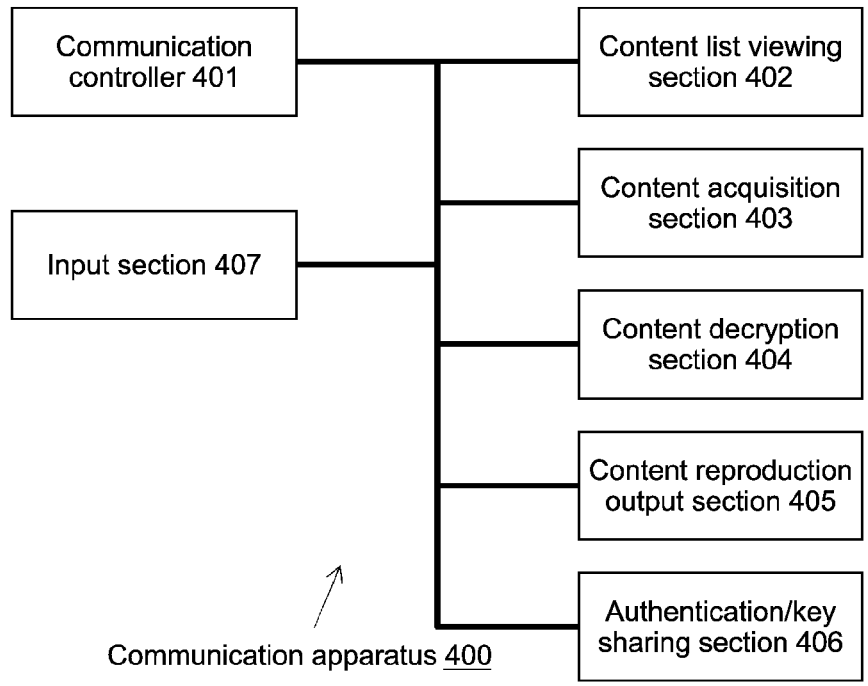
FIG. 4 is a diagram schematically showing a functional structure of a communication apparatus 400 that operates as terminals 102 and 202 in FIGS. 1 and 2.

FIG. 4 schematically shows a functional structure of a communication apparatus 400 that operates as the terminals 102 and 202 (i.e., Sink) in FIGS. 1 and 2.

A communication controller 401 collectively controls entire operations of the communication apparatus 400 as well as control communication operations made via the home network and the external network.

A content list viewing section 402 makes a content list acquisition request to the servers 101 and 201 as the Sources and displays a viewing screen for the acquired content list. For example, a content list screen is displayed when a list of contents that the servers 101 and 201 can provide is acquired as CDS information (described above). Through the list screen, the user can select a content to be reproduced and output. This embodiment has a feature that, in the case of the terminal 202 that remotely accesses the server 201, the list of providable contents is restricted based on the registration time and date with respect to the server 201 and the content acquisition time and date, the details of which will be described later.

A content acquisition section 403 transmits a content acquisition request to the servers 101 and 201 and acquires contents in the servers. The content acquisition section 403 requests an acquisition of a content selected by the user on the content list screen displayed by the content list viewing section 402, for example. For example, an HTTP protocol is used for the content acquisition request with respect to the servers 101 and 201 and the content acquisition (to be described later). This embodiment has a feature that, in the case of the terminal 202 that remotely accesses the server 201, acquirable contents are restricted based on the registration time and date with respect to the server 201 and the content acquisition time and date, the details of which will be described later.

The contents acquired from the servers 101 and 201 are encrypted using an exchange key shared with the servers 101 and 201 by an authentication/key sharing section 406. A content decryption section 404 decrypts the encrypted contents acquired from the servers 101 and 201 using an encryption key. Then, a content reproduction output section 405 reproduces and outputs the decrypted contents.

The authentication/key sharing section 406 performs, according to the authentication and key exchange (AKE) algorithm defined by DTCP-IP, mutual authentication and encryption key sharing for a content encryption with the servers 101 and 201 as content request destinations. The authentication/key sharing section 406 shares the remote access exchange key $K_R$ with the server 201 that requests a content by a remote access from the external network. The authentication/key sharing section 406 also performs a pre-registration for a remote access with respect to the server 201 when connecting with the home network 210.

The functional blocks 402 to 406 described above can also be realized as an application program that the communication controller 401 executes on a higher level than an operating system and a TCP/IP protocol. This type of application program can be delivered from a predetermined download site on a wide area network such as the Internet and is used after being downloaded in a multifunctional terminal that reproduces a content in a home server, such as a smartphone.

Such a download site is constituted of, for example, the server 2610 including the storage apparatus 2611 that stores a computer program and the communication apparatus 2612 that permits the download upon receiving a download request for a computer program (see FIG. 26), and structures the computer program delivery system 2600 together with a client apparatus that installs the downloaded computer program (DTCP_Source or DTCP_Sink). This type of server also includes the information notification apparatus 2613 that notifies information indicating a name of a computer program in response to the computer program download request from the client. The information notification apparatus 2613 notifies, together with a name of the computer program, information indicating that the computer program is an application permitted to view a commercial content recorded at home at a remote location.

In this embodiment, the remote access from the terminal 202 to the server 201 as shown in FIG. 2 is restricted based on the registration time and date with respect to the server 201, and the remote access is restricted after an elapse of a predetermined period from the registration time and date (to be described later). Regarding the terminal 202 that performs the remote access, for example, the authentication/key sharing section 406 may manage the registration time and date with respect to the server 201, and a reregistration procedure may be automatically executed before an elapse of a predetermined period so as to refresh the registration time and date so that the remote access is not restricted.

B. Registration Procedure

Figure 5:
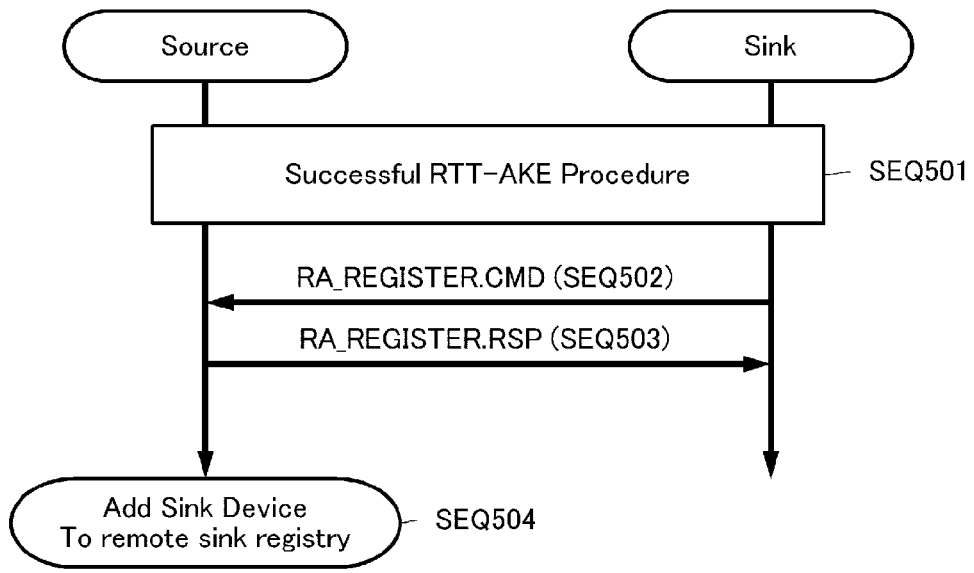
FIG. 5 is a diagram showing a procedure of registering a Sink that performs a remote access in a Source, that is described in a DTCP specification.

FIG. 5 shows a procedure of registering a Sink device that performs a remote access in a Source device, that is described in paragraph V1SE.10.7.1 in a DTCP specification, DTCP Volume 1 Supplement E Mapping DTCP to IP, Revision 1.4ed1 (Informational Version). In the figure, the Sink device corresponds to the terminal 202, and the Source device corresponds to the server 201.

First, under RTT (Round Trip Time) control, an AKE procedure is performed between the Source device and the Sink device (SEQ501). For example, if the Source device and the Sink device are within the home network 210, the RTT control is cleared and the AKE procedure ends successfully. The RTT-AKE procedure itself is not directly related to the gist of the technique disclosed in the specification, so thus detailed descriptions thereof will be omitted.

Next, the Sink device transmits its own Sink-ID to the Source device using a command RA_REGISTER.CMD (SEQ502).

Here, the Sink device transmits its unique Device ID or IDu as the Sink-ID (when Device ID does not become specific information of Sink since Sink device is mounting Common Device Key and Common Device Certificate, IDu is used as Sink-ID).

The Source device checks whether the Sink-ID received based on RA_REGISTER.CMD coincides with the Device ID or IDu received in the RTT-AKE procedure completed immediately before that.

Further, the Source device checks whether the received Sink-ID is already stored in the remote sink registry (managed by terminal management section 307). When the received Sink-ID is already stored, the procedure ends as it is.

On the other hand, when the received Sink-ID is not stored in the remote sink registry, the Source device checks whether the remote sink registry is full. Then, when the received Sink-ID coincides with the Device ID or IDu received in the RTT-AKE procedure completed immediately before that and the remote sink registry is not full, the Source device additionally stores the Sink-ID in the remote sink registry (SEQ504).

Further, the Source device sends back the registered result to the Sink device by a command RA_REGISTER.RSP (SEQ503).

Considering it based on the communication system 200 shown in FIG. 2, the server 201 as the Source device additionally stores the Sink-ID of the terminal 201 (when connected to home network 210) that has succeeded in the RTT-AKE procedure in the remote sink registry managed by the terminal management section 307.

Here, if the server 201 continues to hold the Sink-ID once registered in the remote sink registry, there is a problem that, once a terminal of a third person is registered in the server, that third person can continuously use contents in the server after that.

In this regard, in this embodiment, the server 201 restricts the remote access from the terminal 202 based on the registration time and date of the terminal 202 with respect to the server 201, with the result that a continuous use by a third person once registered is prevented, and a use of a content exceeding a personal use range is suitably suppressed.

C. Restriction of Remote Access Based on Registration Time and Date

As a method of restricting, by the server 201, a remote access from the terminal 202 based on the registration time and date, there is a method of setting a first predetermined period (e.g., 30 days) from the registration time and date as an expiration date for permitting a remote access of the terminal. As long as the terminal 202 requesting to remotely access a content is within the expiration date, the server 201 permits the use of the content, but a remote access from the terminal 202 exceeding the expiration date is unpermitted.

The server 201 only needs to calculate, when registering the terminal 202 in the remote sink registry, for example, the expiration date of the terminal 202 by adding the first predetermined period to the current time and date and store it in the terminal management section 307 as a pair with the Sink-ID.

Figures 6, 7:
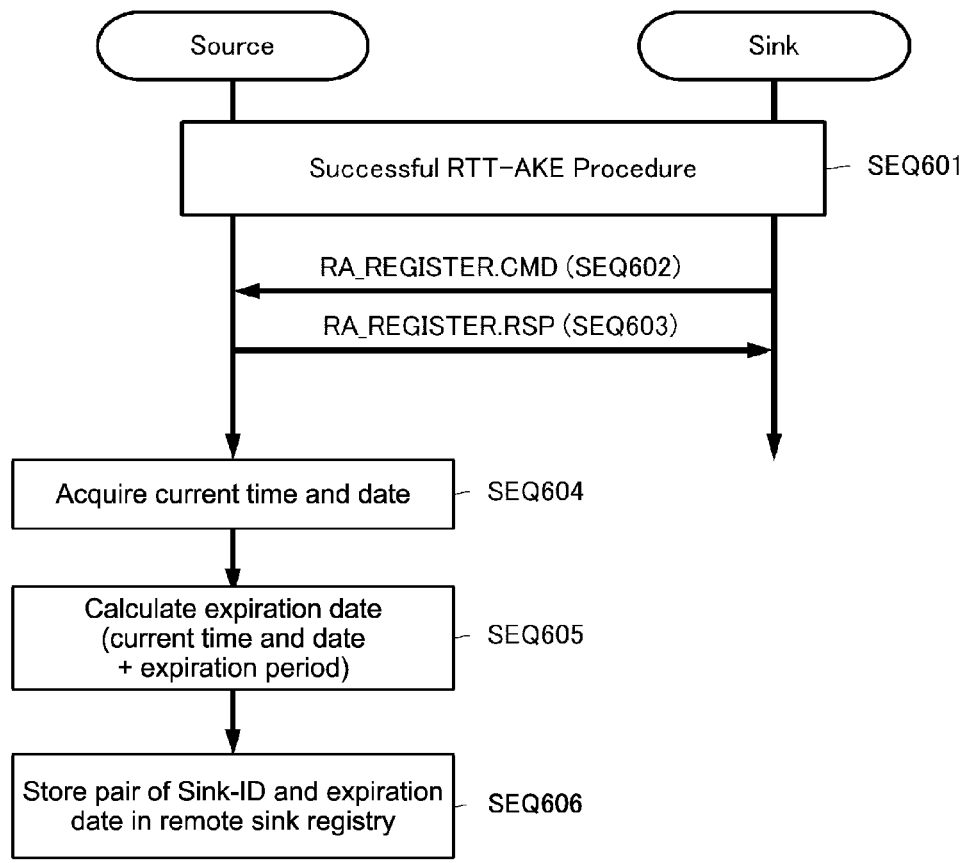
FIG. 6 is a diagram showing a procedure of registering, in a Source device, a Sink device that performs a remote access together with an expiration date.
FIG. 7 is a diagram exemplifying a registration content of a remote sink registry in which a Sink-ID and the expiration date are in a pair.

FIG. 6 shows a procedure of registering, in the Source device, the Sink device that performs a remote access together with the expiration date. It should be noted that the Source device is provided on the home network 210 and corresponds to the server 201 that transmits a content, and the Sink device corresponds to the terminal 202 that requests a content to the server 201 (same holds true in descriptions below). After the registration procedure shown in FIG. 6 is once finished on the home network 210, the Sink device remotely accesses the server 201 from the external network 220 such as the Internet.

First, the AKE procedure is performed between the Source device and the Sink device under RTT (Round Trip Time) control (SEQ601).

Then, upon successfully ending the RTT-AKE procedure, the Sink device uses the command RA_REGISTER.CMD to transmit its own Sink-ID to the Source device (SEQ602).

In contrast, the Source device checks whether the Sink-ID received by the RA_REGISTER.CMD coincides with the Device ID or IDu received in the RTT-AKE procedure completed immediately before that, the Sink-ID is not yet stored in the remote sink registry, and the remote sink registry is not full. Then, when those conditions are satisfied and the Sink-ID is to be additionally stored in the remote sink registry, the Source device sends back the command RA_REGISTER.RSP to the Sink device (SEQ603).

Further, upon acquiring the current time and date as the registration time and date of the Sink device (SEQ604), the Source device calculates the expiration date by adding the first predetermined period (e.g., 30 days) as a registration expiration period of the Sink device to the current time and date (SEQ605) and stores it in a pair with the Sink-ID in the remote sink registry (SEQ606).

FIG. 7 exemplifies a registration content of the remote sink registry in which the Sink-ID and the expiration date are stored in a pair. It should be noted that the information management of the terminal registration time and date and the expiration date as shown in FIG. 7 may be performed integrally by a management server provided on a cloud instead of performing it individually within the server 201 on the home network 210.

The Source device (server 201) is capable of acquiring the current time and date as the registration time and date based on, for example, a clock function incorporated into the server (illustration is omitted in FIG. 3), a time signal included in broadcast waves (e.g., case where content acquisition section 303 includes tuner function and receives broadcast waves), and time information acquired from a server (not shown) on a network.

It should be noted that regarding the terminal 202, so that a remote access to the server 201 is not restricted based on the registration time and date while being unnoticed by a user, the authentication/key sharing section 406 or the like may manage the registration time and date with respect to the server 201, and a reregistration procedure (i.e., restart of processing sequence shown in FIG. 6) may be automatically executed before an elapse of a predetermined period so as to refresh the registration time and date so that the remote access is not restricted. Of course, the user of the terminal 202 may manually refresh the registration time and date.

Figure 8:
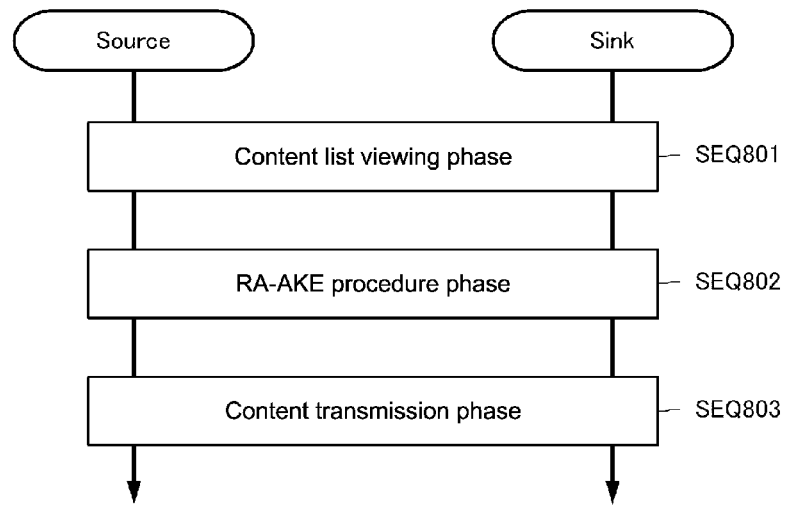
FIG. 8 is a diagram schematically showing a procedure of performing a content transmission by a remote access between the Source device and the Sink device.

FIG. 8 schematically shows a procedure of performing a content transmission by a remote access between the Source device and the Sink device after the preregistration described above. The content transmission shown in the figure is constituted of a content list viewing phase (SEQ801) in which the Sink device designates a content to be requested for a transmission, an RA-AKE procedure phase (SEQ802) in which a mutual authentication and key exchange procedure is performed between the Source device and the Sink device to share a remote access exchange key $K_R$, and a content transmission phase (SEQ803) in which a content designated in the content list viewing phase is encrypted and transmitted using the remote access exchange key $K_R$.

Figure 9:
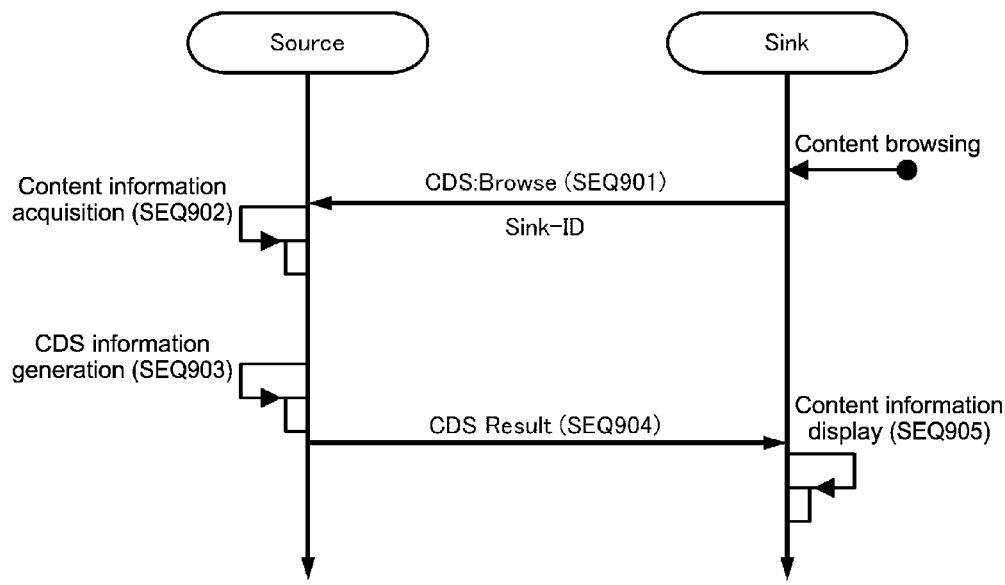
FIG. 9 is a diagram schematically showing a content of a content list viewing phase (SEQ801).

FIG. 9 schematically shows a content of the content list viewing phase (SEQ801).

A content list viewing request is issued from the content list viewing section 402 of the Sink device (SEQ901).

In this embodiment, a CDS (Content Directory Service) function for delivering a content list and specific information of the contents in a hierarchized form, that is defined by UPnP as a base of DLNA, is applied to the viewing of a content list. Therefore, in SEQ901, a CDS:Browse action is issued from the Sink device.

The content list viewing request includes a Sink-ID for specifying the Sink device. Means for transmitting the Sink-ID by the CDS:Browse request may involve newly providing a header field (e.g., SinkID.dtcp.com) and performing transmission using the header part of HTTP as a parameter.

On the Source device side, since the CDS:Browse action is issued with respect to a content providable by the content provision section 304 (e.g., broadcast content or commercial content acquirable by content acquisition section 303 or content already recorded in content recording section 302 as its own storage), the content list provision section 305 acquires all acquirable content information related to the relevant content (SEQ902) and generates CDS information having a sufficient information amount (SEQ903). The Source device may restrict, with respect to the Sink device that performs the remote access, provision of the CDS information based on the expiration date of the Sink device (to be described later). Then, the Source device sends it back as a CDS Result to the Sink device (SEQ904).

On the Sink device side, the content list viewing section 402 analyzes the received CDS Result and displays content information including a title and more-specific information of a content (SEQ905).

Figure 22:
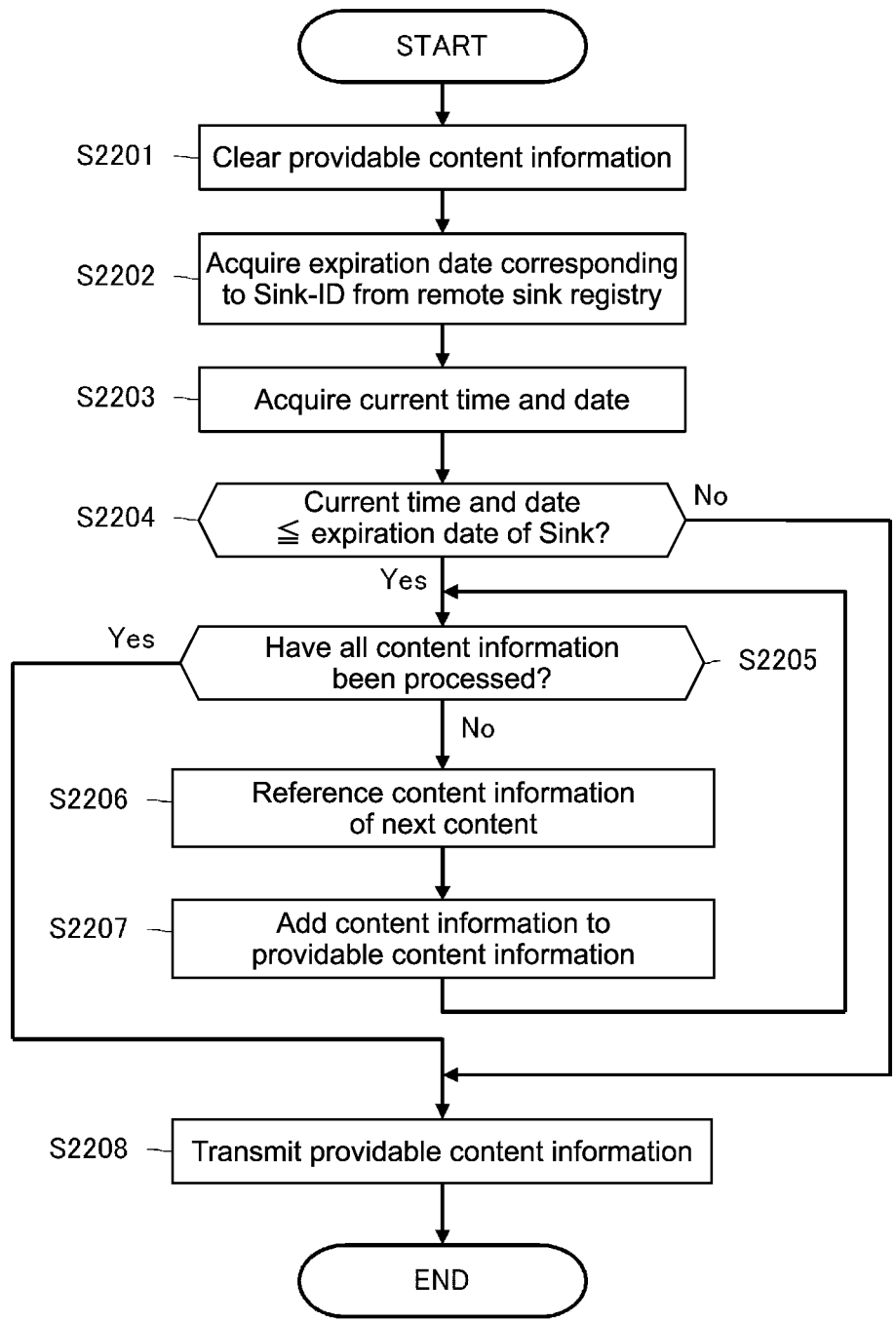
FIG. 22 is a flowchart showing a processing procedure for restricting provision of CDS information based on an expiration date of the Sink device performing a remote access.

FIG. 22 is a flowchart showing a processing procedure for the Source device to restrict, with respect to the Sink device performing a remote access, provision of CDS information based on the expiration date of the Sink device in the content list viewing phase (SEQ801).

First, the Source device clears providable content information (Step S2201).

Next, the Source device acquires, from the remote sink registry, an expiration date corresponding to the Sink-ID of the Sink device as the request source (Step S2202) and acquires the current time and date (Step S2203).

Then, the Source device checks whether the current time and date has exceeded the expiration date of the request source Sink device (Step S2204). When the current time and date has exceeded the expiration date (No in Step S2204), subsequent addition processing of content information is skipped, and content information is transmitted in an empty state (Step S2208).

On the other hand, when the current time and date has not exceeded the expiration date of the request source Sink device (Yes in Step S2204), content information is created as usual. In other words, until all content information are processed (No in Step S2205), processing of referencing content information of unprocessed content (Step S2206) and processing of adding the content information to providable content information (Step S2207) are executed repetitively. Then, the Source device transmits the completed content information to the request source Sink device (Step S2208).

The processing procedure shown in FIG. 22 is carried out in SEQ903 in the sequence shown in FIG. 9, for example. It should be noted that the Source device does not need to perform this processing procedure and may provide content information for all providable contents irrespective of the expiration date of the Sink device.

The user of the Sink device can select a content to reproduce from the displayed content list. While a content transmission from the Source device to the Sink device is started as a content is selected, the mutual authentication and key exchange for a remote access, that is, the RA-AKE processing is carried out between the Sink device and the Source device prior to the content transmission.

Figure 10:
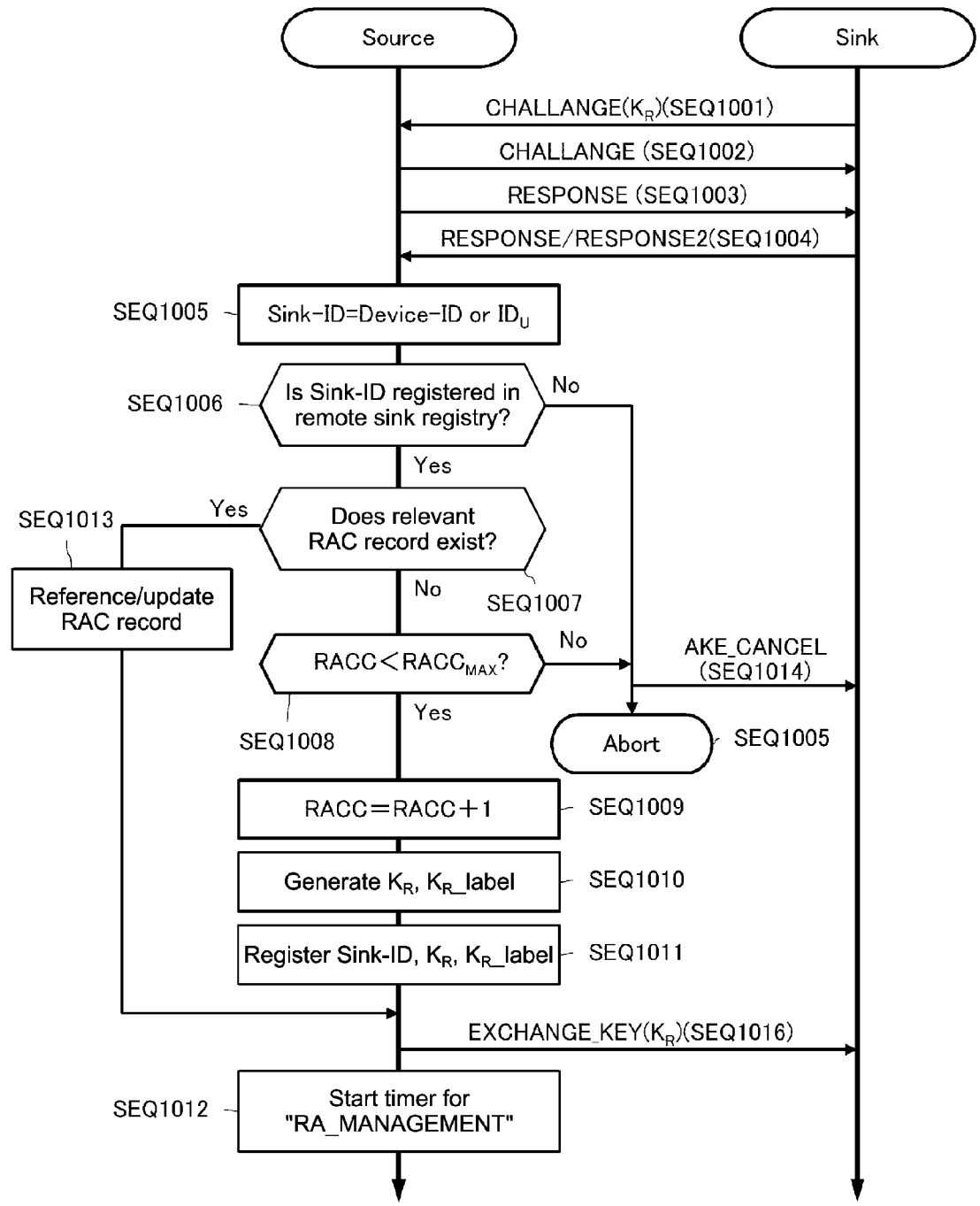
FIG. 10 is a diagram showing a content of an RA-AKE procedure phase described in paragraph V1SE.10.7.2 in the DTCP specification.

FIG. 10 shows details of a content of the RA-AKE procedure phase (SEQ802) described in paragraph V1SE.10.7.2 in the DTCP specification (described above).

The Sink device transmits a CHALLENGE command including an exchange key field in which a bit for a remote access exchange key $K_R$ (Remote Exchange Key) is set and requests the Source device to perform the AKE processing (SEQ1001). Then, a challenge/response part of the authentication procedure is executed between the Source device and the Sink device (SEQ1002 to 1004).

It should be noted that when the $K_R$ bit of the CHALLENGE command is not set, the Source device can cancel the RA-AKE processing and continue the AKE procedure except the RA-AKE.

Upon receiving the Device ID or IDu as the Sink-ID from the Sink device in the challenge/response procedure (SEQ1005), the Source device checks whether the Sink-ID is registered in the remote sink registry managed in its own terminal management section 307 (SEQ1006).

When the Sink-ID is not listed in the remote sink registry (No in SEQ1006), the Source device transmits an AKE_CANCEL command to the Sink device (SEQ1014) and cancels the RA-AKE processing (SEQ1015).

On the other hand, when the Sink-ID is already registered in the remote sink registry (Yes in SEQ1006), the Source device checks a RAC registry (to be described later) to judge whether a RAC record corresponding to the Sink-ID already exists (SEQ1007).

When a RAC record corresponding to the Sink-ID exists (Yes in SEQ1007), the Source device determines to use the remote access exchange key $K_R$ and an exchange key label $K_R$ label thereof that are stored in the RAC record. Alternatively, if the content transmission using the remote access exchange key $K_R$ is not performed, the Source device may refer to the RAC record and update stored values of $K_R$ and $K_R$ label (SEQ1013).

When the Sink-ID is registered in the remote sink registry but there is no corresponding RAC record (No in SEQ1007), the Source device checks whether a count value RACC for counting the RAC record is smaller than $RACC_{max}$ (SEQ1008). Here, $RACC_{max}$ is a counter for counting a remote access connection and is initialized to 0 when there is no remote access connection.

When RACC is not smaller than $RACC_{max}$ (No in SEQ1008), the Source device transmits an AKE_CANCEL command to the Sink device (SEQ1014) and cancels the RA-AKE procedure (SEQ1015).

Figures 15, 16:
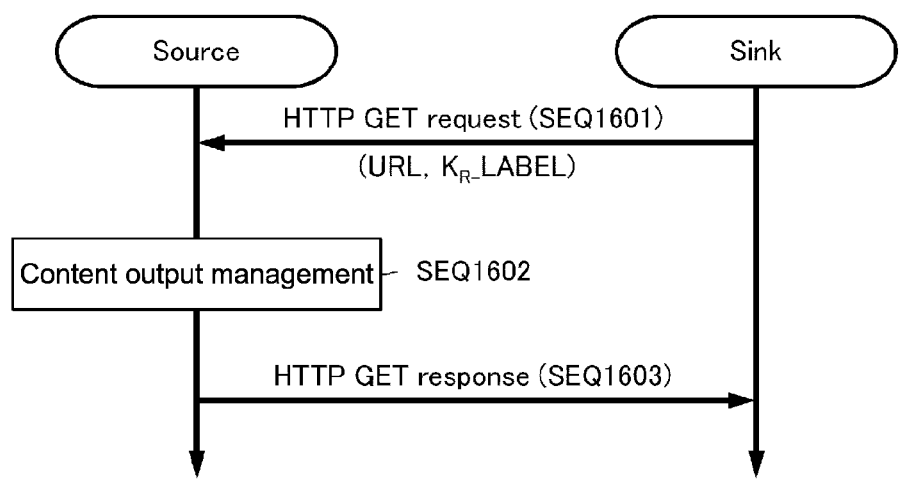
FIG. 15 is a diagram showing a state of storing, as a Rac record, a remote access exchange key $K_R$ and an exchange key label $K_R$ label in association with the Sink-ID.
FIG. 16 is a diagram schematically showing a content of a content transmission phase (SEQ803) for an encrypted transmission using the remote access exchange key $K_R$.

When RACC is smaller than $RACC_{max}$ (Yes in SEQ1008), the Source device generates, after incrementing the value of RACC only by 1 (SEQ1009), the remote access exchange key $K_R$ and the exchange key label $K_R$ label thereof according to a predetermined operation rule (SEQ1010) and stores them in the RAC record in the RAC registry in association with the Sink-ID of the Sink device (SEQ1011). The server 201 manages the RAC record in the terminal management section 307, for example. FIG. 15 shows a state of storing, as the RAC record, the remote access exchange key $K_R$ and the exchange key label $K_R$ label generated with respect to the Sink device in association with the Sink-ID.

Then, the Source device transmits the remote access exchange key $K_R$ and the exchange key label $K_R$ label taken out from the existing RAC record (including update) or a newly-generated remote access exchange key $K_R$ and exchange key label $K_R$ label to the Sink device (SEQ1016).

When the Source device supports an RA_MANAGEMENT function, a $K_R$ existence timer for maintaining the remote access exchange key $K_R$ is started, and $K_R$ is held for at least one minute (SEQ1012).

In the RA-AKE procedure described in paragraph V1SE.10.7.2 of the DTCP specification shown in FIG. 10, the Source device shares the remote access exchange key $K_R$ after confirming that the Sink-ID of the Sink device is registered in the remote sink registry in the first condition judgment SEQ1006.

As described above, when the Source device continues to hold the Sink-ID once registered in the remote sink registry, there is a problem that if a terminal of a third person is once registered in the server, contents in the server can be continuously used by the third person after that.

In this regard, in this embodiment, the Source device sets an expiration date from the registration time and date with respect to the Sink-ID registered in the remote sink registry (see FIGS. 6 and 7) and deletes the expired Sink-ID from the remote sink registry to thus prevent a continuous use by a third person once registered and suitably suppress the use of a content exceeding a personal use range. The expired Sink-ID deletion processing can be carried out in the Source device, for example.

Figure 11:
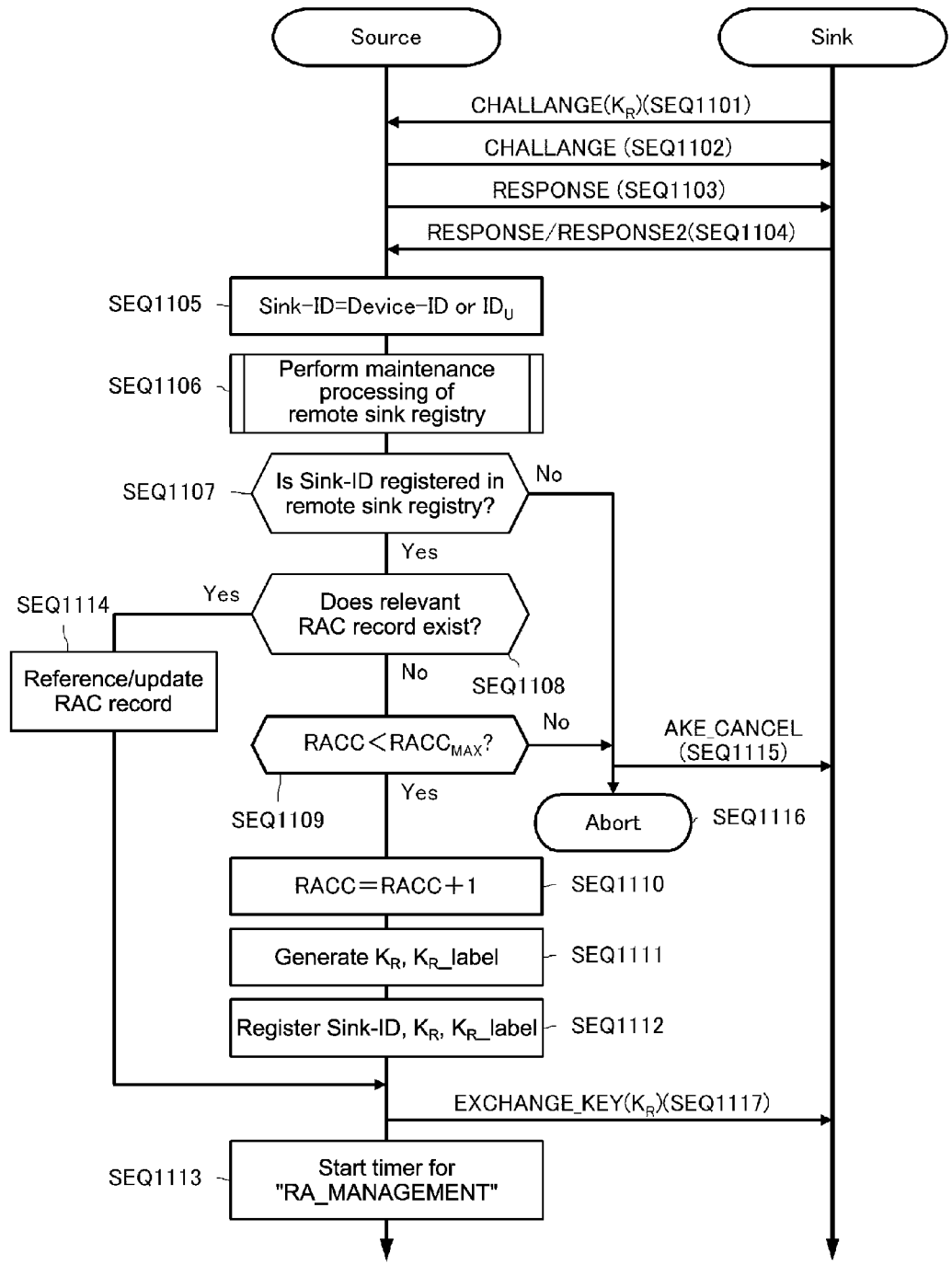
FIG. 11 is a diagram showing a content of the RA-AKE procedure phase including processing of deleting an expired Sink-ID from the remote sink registry.

FIG. 11 shows details a content of the RA-AKE procedure phase (SEQ802) including the processing of deleting an expired Sink-ID from the remote sink registry.

As the Sink device transmits a CHALLENGE command including an exchange key field in which a bit for a remote access exchange key $K_R$ is set and requests the Source device to carry out the AKE processing (SEQ1101), the challenge/response part of the authentication procedure is executed between the Source device and the Sink device (SEQ1102 to 1104). Then, the Source device can receive the Device ID or IDu as the Sink-ID from the Sink device in the challenge/response procedure (SEQ1105).

Here, the Source device performs a maintenance of the remote sink registry, that is, processing of deleting the expired Sink-ID from the remote sink registry (SEQ1106). By deleting the expired Sink-ID set based on the registration time and date from the remote sink registry, a continuous use by a once-registered third person is prevented. After the maintenance processing of the remote sink registry is carried out, only entries within the expiration dates remain. Details of the remote sink registry maintenance processing will be given later.

Next, the Source device checks whether the received Sink-ID is listed in the remote sink registry managed in its own terminal management section 307 (SEQ1107).

When the Sink-ID is not listed in the remote sink registry (No in SEQ1107), the Source device transmits an AKE_CANCEL command to the Sink device (SEQ1116) and cancels the RA-AKE procedure (SEQ1117).

On the other hand, when the Sink-ID is listed in the remote sink registry (Yes in SEQ1107), the Source device checks the RAC registry (to be described later) for judging whether a RAC record corresponding to the Sink-ID already exists (SEQ1108).

When a RAC record corresponding to the Sink-ID exists (Yes in SEQ1108), the Source device determines to use the remote access exchange key $K_R$ and an exchange key label $K_R\_label$ thereof that are stored in the RAC record. Alternatively, if the content transmission using the remote access exchange key $K_R$ is not performed, the Source device may refer to the RAC record and update stored values of $K_R$ and $K_R\_label$ (SEQ1114).

When the Sink-ID is listed in the remote sink registry but there is no corresponding RAC record (No in SEQ1108), the Source device checks whether a count value RACC for counting the RAC record is smaller than $RACC_{max}$ (SEQ1109).

When RACC is not smaller than $RACC_{max}$ (No in SEQ1109), the Source device transmits an AKE_CANCEL command to the Sink device (SEQ1115) and cancels the RA-AKE procedure (SEQ1116).

When RACC is smaller than $RACC_{max}$ (Yes in SEQ1109), the Source device generates, after incrementing the value of RACC only by 1 (SEQ1110), the remote access exchange key $K_R$ and the exchange key label $K_R\_label$ thereof according to a predetermined operation rule (SEQ1111) and stores them in the RAC record in the RAC registry in association with the Sink-ID of the Sink device (SEQ1112). The server 201 manages the RAC record in the terminal management section 307, for example. FIG. 15 shows a state of storing, as the RAC record, the remote access exchange key $K_R$ and the exchange key label $K_R\_label$ generated with respect to the Sink device in association with the Sink-ID.

Then, the Source device transmits the remote access exchange key $K_R$ and the exchange key label $K_R\_label$ taken out from the existing RAC record (including update) or a newly-generated remote access exchange key $K_R$ and exchange key label $K_R\_label$ to the Sink device (SEQ1117). When the Source device supports the RA_MANAGEMENT function, a $K_R$ existence timer for maintaining the remote access exchange key $K_R$ is started, and $K_R$ is held for at least one minute (SEQ1113).

In the remote sink registry maintenance processing carried out in SEQ1106, the registration content of the remote sink registry in which the Sink-ID and the expiration date are stored in a pair (see FIG. 7) is referenced, and an entry of the expired Sink-ID set based on the registration time and date is deleted from the remote sink registry. The maintenance processing may be carried out in the server 201 as the Source device but may also be integrally carried out in a management server on a cloud together with the management of information on the registration time and date and expiration date of the terminal.

Figure 12:
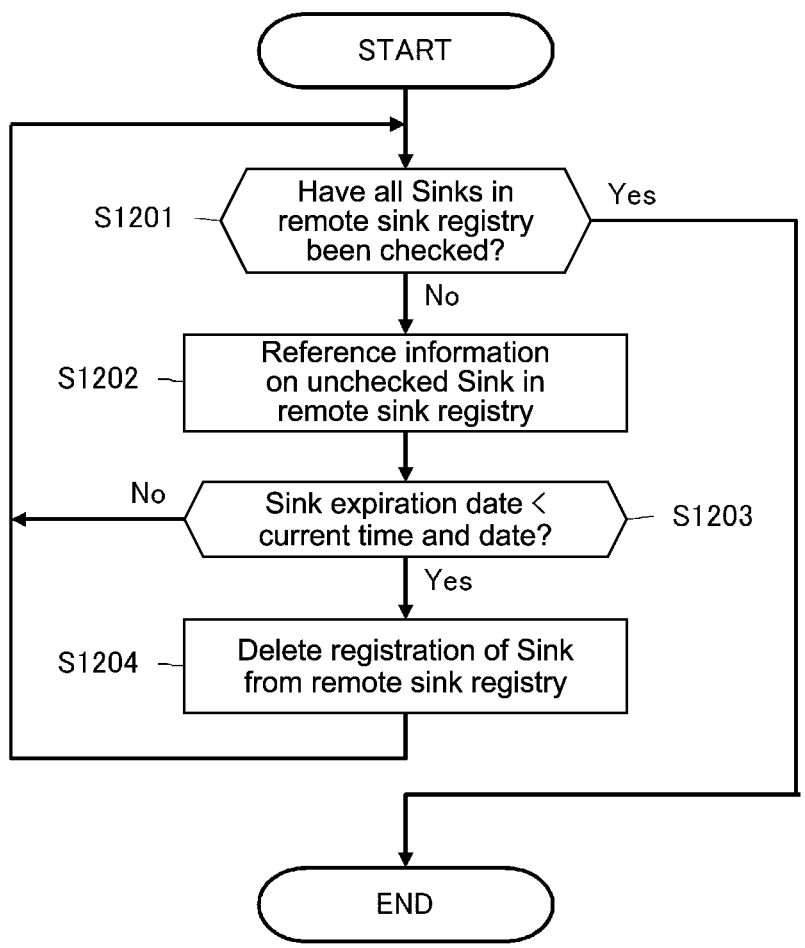
FIG. 12 is a flowchart showing a procedure of maintenance processing of the remote sink registry.

FIG. 12 is a flowchart showing a procedure of the maintenance processing of the remote sink registry. For convenience, the descriptions below will be given assuming that the maintenance processing is carried out in the server 201 as the Source device. The maintenance processing is carried out by the authentication/key sharing section 306 of the server 201 in the RA-AKE procedure phase, for example.

The server 201 references, regarding the Sink device for which the expiration date is unchecked (No in Step S1201) in the remote sink registry managed in the terminal management section 307, the expiration date stored in a pair with a Sink-ID thereof (Step S1202) and checks whether the current time and date has exceeded the expiration date (Step S1203). Then, an entry of the Sink-ID for which the current time and date has exceeded the expiration date (Yes in Step S1203) is deleted from the remote sink registry (Step S1204).

Then, the server 201 repetitively executes the processing of Steps S1202 to S1204 until the processing is ended for all Sink entries registered in the remote sink registry (Yes in Step S1201).

Instead of carrying out the maintenance processing of the remote sink registry shown in FIG. 12 individually by the server 201 (i.e., carry out in unit of home network 210 where server 201 is provided), a centralized management may be integrally performed on the remote sink registry of the server 201 in each home by a management server on a cloud.

Further, instead of carrying out the maintenance processing of the remote sink registry as shown in FIG. 12 successively in the RA-AKE procedure, the processing may be carried out periodically by the server 201, the management server on a cloud, or the like (irrespective of whether RA-AKE procedure is to be carried out).

Moreover, although single maintenance processing involves the expiration date check processing for all entries in the remote sink registry in FIGS. 11 and 12, it is also possible to carry out the expiration date check processing (processing of deleting expired entry) only for an entry corresponding to the Sink-ID as a target of the RA-AKE procedure.

Furthermore, instead of carrying out the deletion processing of an expired terminal record in the RA-AKE procedure phase, the subsequent content transmission phase may include a "content output management" for restricting a content transmission to an expired terminal. In this case, the RA-AKE procedure according to the procedure shown in FIG. 10, that does not include the deletion processing, is carried out instead of that shown in FIG. 11, and a remote access exchange key $K_R$ and exchange key label $K_R\_label$ thereof are distributed to all Sink devices irrespective of the expiration date. In the content transmission phase of SEQ803, the expiration date of the request source Sink device is checked.

Figure 18:
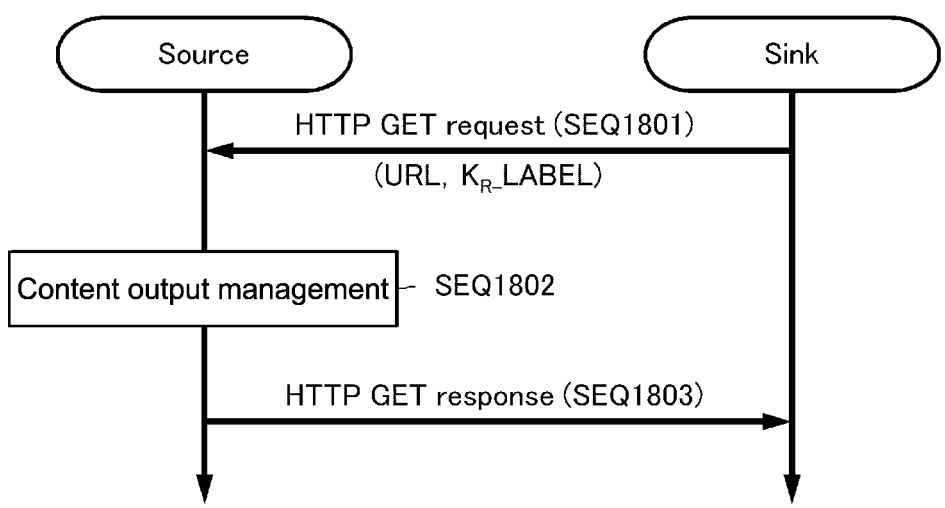
FIG. 18 is a diagram schematically showing a content of the content transmission phase (SEQ803) including a content output management based on an expiration date.

FIG. 18 schematically shows a content of the content transmission phase (SEQ803) including a content output management based on an expiration date.

After acquiring the remote access exchange key $K_R$ and exchange key label $K_R\_label$ thereof acquired by the RA-AKE procedure, the Sink device requests a content transmission to the Source device by an HTTP request (HTTP GET request) using an HTTP GET method, for example (SEQ1801). In the request, a label $K_R\_label$ as an ID of the remote access exchange key $K_R$ is transmitted together with a URL (Uniform Resource Locator) of the content. Here, a header field for transmitting the exchange key ID ($K_R\_label$) from the Sink device to the Source device will be defined.

Here, upon receiving a content transmission request from the Sink device, the Source device executes processing of the content output management based on the expiration date (SEQ1802).

When transmitting the remote access exchange key $K_R$ and exchange key label $K_{R\_}$label thereof to the Sink device in the RA-AKE procedure, the Source device stores them as a RAC record in association with the Sink-ID (as described above; see FIG. 15). Therefore, the Source device can check the Sink-ID of the request source Sink device from the RAC record corresponding to the exchange key label $K_{R\_}$label included in the content request.

Further, the Source device calculates the expiration date when registering the Sink device, that is, when registering the Sink-ID in the remote sink registry, and stores it in a pair with the Sink-ID (as described above; see FIG. 7). Therefore, the expiration date of the Sink device can be checked based on the Sink-ID acquired from the RAC record.

Then, the Source device permits the content request when the current time and date has not exceeded the expiration date of the Sink device and does not permit the content request when the current time and date has exceeded the expiration date. Moreover, the Source device may delete an entry of the expired Sink device from the remote sink registry.

When permitting the content request from the Sink device, the Source device takes out a remote access exchange key $K_R$ designated by an exchange key label $K_{R\_}$label from the RAC record, uses it to encrypt a content, and transmits the content to the Sink device as an HTTP response (HTTP GET response) (SEQ1803).

Figure 19:
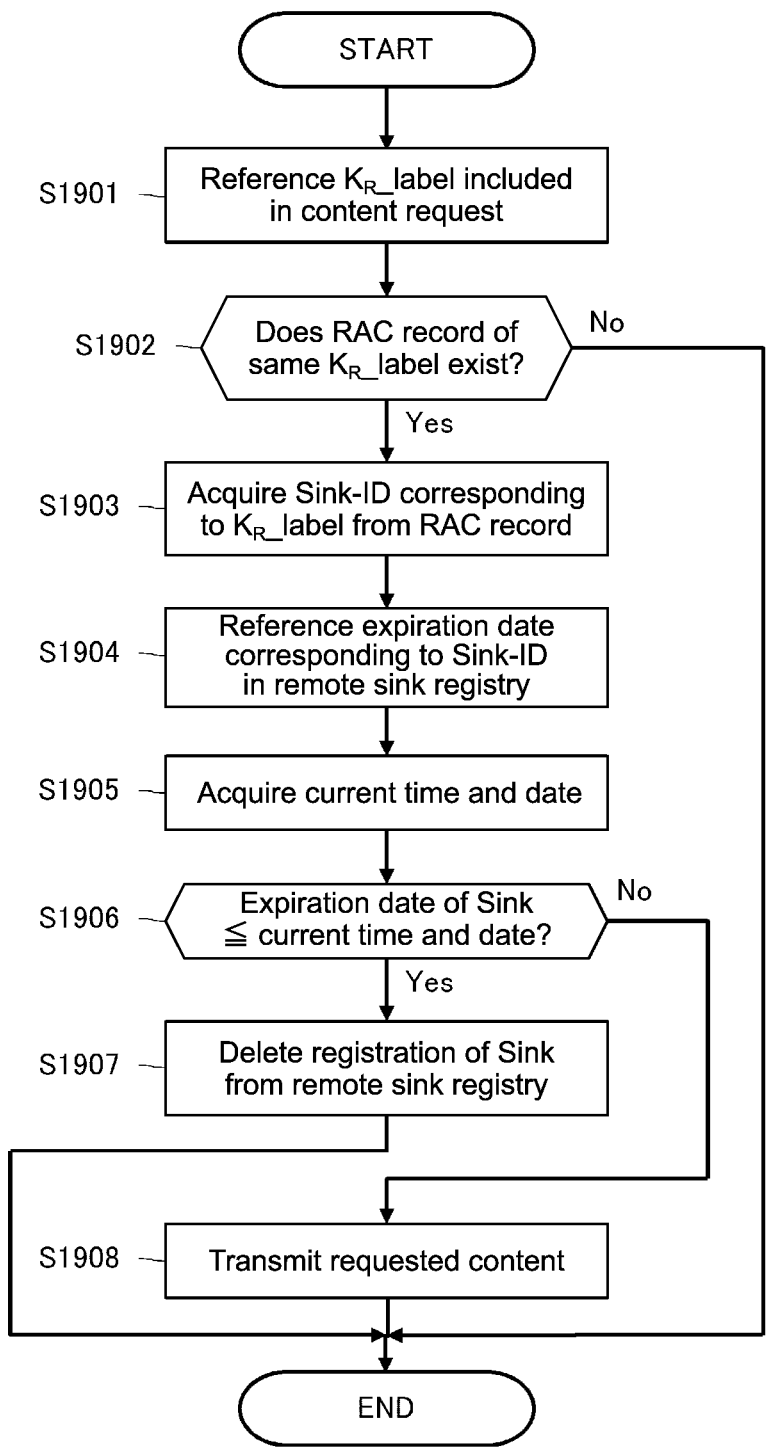
FIG. 19 is a flowchart showing a processing procedure of the content output management carried out in SEQ1802.

FIG. 19 is a flowchart showing a processing procedure of the content output management carried out in SEQ1802. In the descriptions below, for convenience, it is assumed that the content provision section 304 carries out the content output management processing in the server 201 as the Source device, for example.

The server 201 references the exchange key label $K_{R\_}$label included in the content request (HTTP GET request) (Step S1901) and checks whether a RAC record of the same exchange key label $K_{R\_}$label exists in the terminal management section 307 (Step S1902).

Here, when there is no RAC record of the same exchange key label $K_{R\_}$label (No in Step S1902), it means that an illicit content request has been made due to the reason that the request source Sink device has not performed the RA-AKE procedure or the like. Then, the server 201 skips all subsequent processing and ends the processing routine.

On the other hand, when there is a RAC record of the same exchange key label $K_{R\_}$label (Yes in Step S1902), the server 201 acquires the Sink-ID corresponding to the exchange key label $K_{R\_}$label from the RAC record (Step S1903).

Next, the server 201 acquires an expiration date stored in a pair with the Sink-ID from the remote sink registry in the terminal management section 307 (Step S1904). It should be noted that when the expiration date of each Sink-ID is managed by the management server on a cloud, for example, the server 201 accesses the management server via the communication controller 301 and acquires information on the relevant expiration date.

Then, the server 201 acquires the current time and date (Step S1905) and checks whether the current time and date has exceeded the expiration date of the request source Sink device (Step S1906). When the current time and date has exceeded the expiration date (Yes in Step S1906), an entry of the relevant Sink-ID is deleted from the remote sink registry (Step S1907), and the processing routine is ended.

On the other hand, when the current time and date has not exceeded the expiration date of the request source Sink device (No in Step S1906), the server 201 permits the content request from the Sink device and transmits the requested content as the HTTP GET response (Step S1908).

As described above, by setting the expiration date by adding the first predetermined period to the registration time and date of the terminal with respect to the server, permitting a remote access to only the terminal within the expiration date with respect to a content in the server, and inhibiting a remote access after the expiration date, a use of a content by a third person exceeding a personal use range can be suppressed.

D. Restriction of Remote Access Based on Registration Time and Date (2)

As another method of restricting a remote access from the terminal 202 based on the registration time and date, there is a method of setting, by the server 201, a second predetermined period α (e.g., 3 days) from the registration time and date as a limit time and date of a content that can be remotely accessed by the terminal 202. For example, a remote access of a content recorded in the content recording section 302 before the limit time and date of the terminal 202 is permitted, but a remote access of a content recorded after the limit time and date is unpermitted. Moreover, a remote access to a content acquired by the content acquisition section 303 before the limit time and date is permitted, but a remote access to a content acquired by the content acquisition section 303 after the limit time and date is unpermitted.

In registering the terminal 202 in the remote sink registry, the server 201 only needs to calculate the limit time and date of the terminal 202 by adding the second predetermined period α to the current time and date and store the limit time and date in a pair with the Sink-ID.

Figures 13, 14:
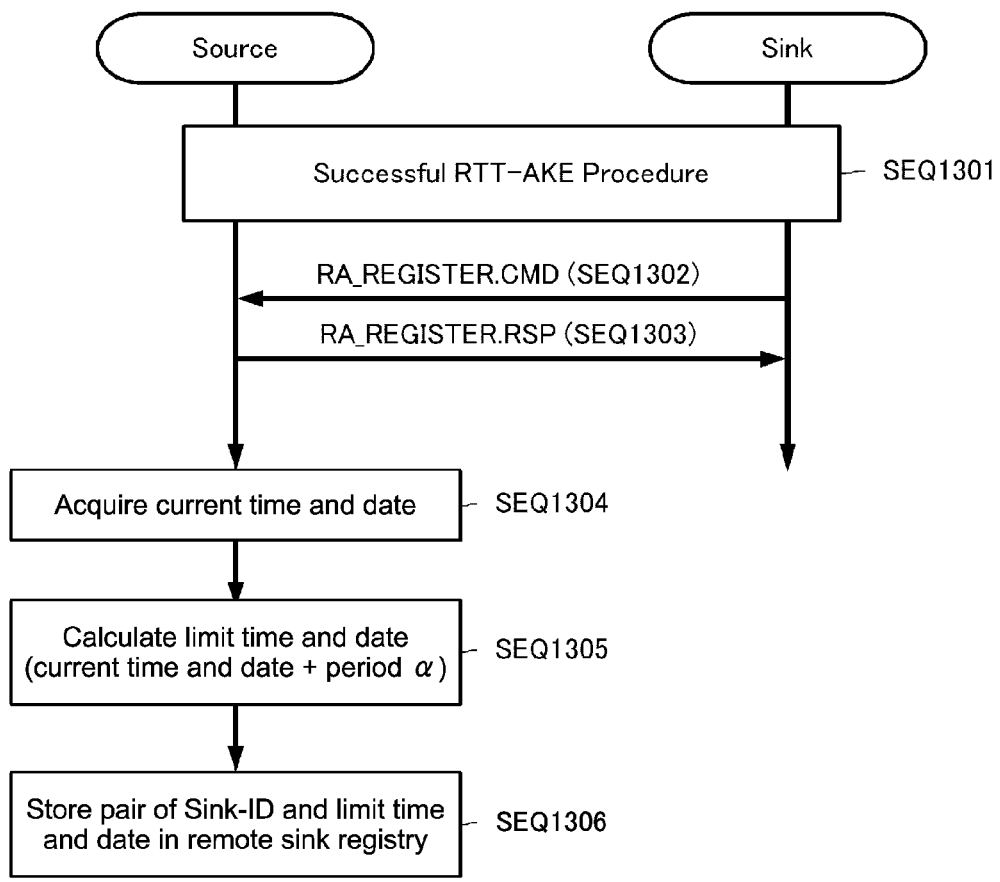
FIG. 13 is a diagram showing a procedure of registering the Sink device that performs a remote access in the Source device together with a limit time and date.
FIG. 14 is a diagram exemplifying a registration content of the remote sink registry in which the Sink-ID and the limit time and date are in a pair.

FIG. 13 shows a procedure of registering the Sink device that performs a remote access in the Source device together with the limit time and date.

First, under RTT (Round Trip Time) control, the AKE procedure is performed between the Source device and the Sink device (SEQ1301). Then, upon successfully ending the RTT-AKE procedure, the Sink device uses a command RA_REGISTER.CMD to transmit its own Sink-ID to the Source device (SEQ1302).

The Source device checks whether the Sink-ID received by the RA_REGISTER.CMD coincides with the Device ID or IDu received in the RTT-AKE procedure completed immediately before that, the Sink-ID is not yet stored in the remote sink registry, and the remote sink registry is not full. Then, when those conditions are satisfied and the Sink-ID is to be additionally stored in the remote sink registry, the Source device sends back the command RA_REGISTER.RSP to the Sink device (SEQ1303).

Further, upon acquiring the current time and date as the registration time and date of the Sink device (SEQ1304), the Source device calculates the limit time and date by adding the second predetermined period α (e.g., 3 days) as a registration limit time and date of the Sink device to the current time and date (SEQ1305) and stores it in a pair with the Sink-ID in the remote sink registry (SEQ1306).

FIG. 14 exemplifies a registration content of the remote sink registry in which the Sink-ID and the limit time and date are stored in a pair. It should be noted that the information management of the terminal registration time and date and the limit time and date as shown in FIG. 14 may be performed integrally by a management server provided on a cloud instead of performing it individually within the server 201 on the home network 210.

It should be noted that the Source device (server 201) is capable of acquiring the current time and date as the registration time and date based on, for example, a clock function incorporated into the server (illustration is omitted in FIG. 3), a time signal included in broadcast waves (e.g., case where content acquisition section 303 includes tuner function and receives broadcast waves), and time information acquired from a server (not shown) on a network.

The mutual authentication and key exchange for a remote access, that is, the RA-AKE processing is carried out between the Sink device and the Source device prior to the content transmission, and the content transmission is started after that.

FIG. 16 schematically shows a content of the content transmission phase (SEQ803) for an encrypted transmission using the remote access exchange key $K_R$. The sequence shown in the figure includes content output management processing based on the limit time and date.

After acquiring the remote access exchange key $K_R$ and exchange key label $K_R\_label$ thereof acquired by the RA-AKE procedure, the Sink device requests a content transmission to the Source device by an HTTP request (HTTP GET request) using an HTTP GET method, for example (SEQ1601). In the request, a label $K_R\_label$ as an ID of the remote access exchange key $K_R$ is transmitted together with a URL (Uniform Resource Locator) of the content. Here, a header field for transmitting the exchange key ID ($K_R\_label$) from the Sink device to the Source device will be defined.

Here, upon receiving a content transmission request from the Sink device, the Source device executes processing of the content output management based on the limit time and date (SEQ1602).

When transmitting the remote access exchange key $K_R$ and exchange key label $K_R\_label$ thereof to the Sink device in the RA-AKE procedure, the Source device stores them as a RAC record in association with the Sink-ID (as described above; see FIG. 15). Therefore, the Source device can check the Sink-ID of the request source Sink device from the RAC record corresponding to the exchange key label $K_R\_label$ included in the content request.

Further, the Source device calculates the limit time and date when registering the Sink device, that is, when registering the Sink-ID in the remote sink registry, and stores it in a pair with the Sink-ID (as described above; see FIG. 14). Therefore, the limit time and date of the Sink device can be checked based on the Sink-ID acquired from the RAC record.

Then, the Source device permits the content request from the Sink device with respect to a content recorded in the Source device before the limit time and date of the request source Sink device and does not permit the content request from the Sink device with respect to a content recorded in the Source device after the limit time and date.

When permitting the content request from the Sink device, the Source device takes out a remote access exchange key $K_R$ designated by an exchange key label $K_R\_label$ from the RAC record, uses it to encrypt a content, and transmits the content to the Sink device as an HTTP response (HTTP GET response) (SEQ1603).

Figure 17:
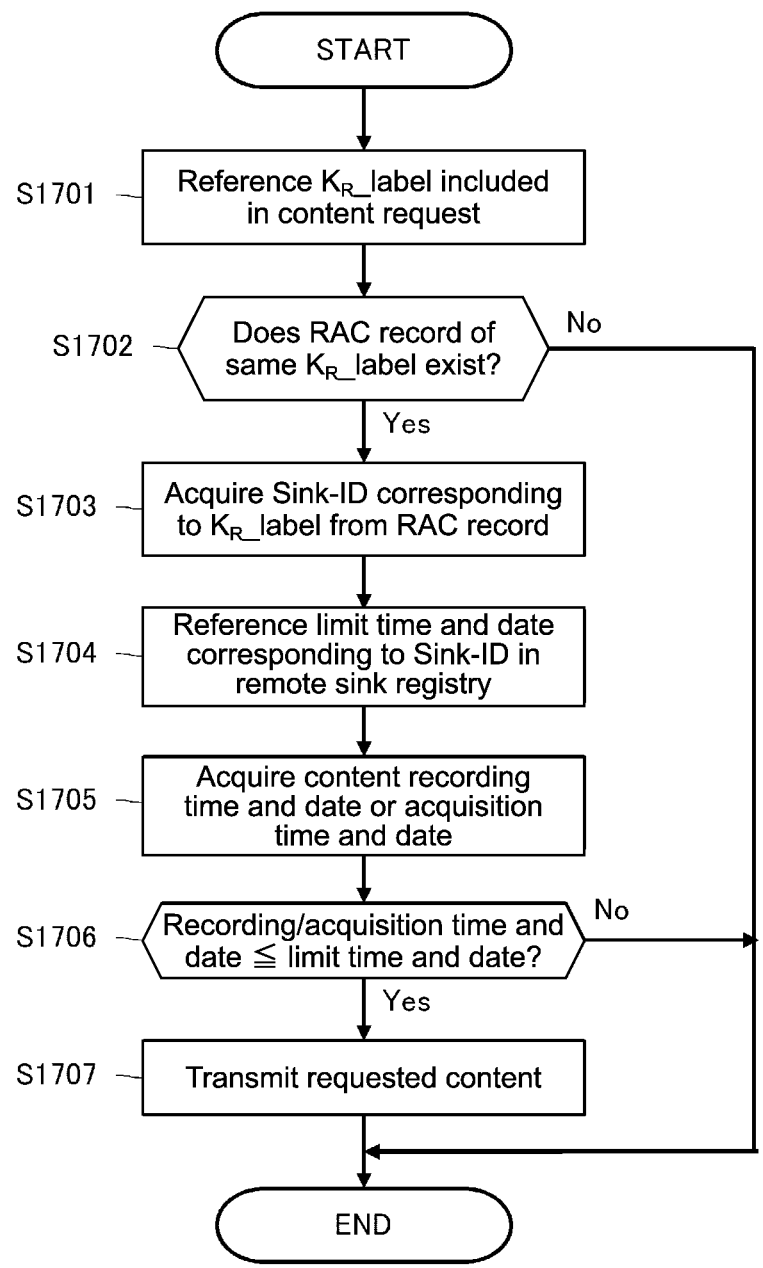
FIG. 17 is a flowchart showing a procedure of content output management processing carried out in SEQ1602.

FIG. 17 is a flowchart showing a procedure of the content output management processing carried out in SEQ1602. In the descriptions below, for convenience, it is assumed that the content provision section 304 carries out the content output management processing in the server 201 as the Source device, for example.

The server 201 references the exchange key label $K_R\_label$ included in the content request (HTTP GET request) (Step S1701) and checks whether a RAC record of the same exchange key label $K_R\_label$ exists in the terminal management section 307 (Step S1702).

Here, when there is no RAC record of the same exchange key label $K_R\_label$ (No in Step S1702), it means that an illicit content request has been made due to the reason that the request source Sink device has not performed the RA-AKE procedure or the like. In this regard, the server 201 skips all subsequent processing and ends the processing routine.

On the other hand, when there is a RAC record of the same exchange key label $K_R\_label$ (Yes in Step S1702), the server 201 acquires the Sink-ID corresponding to the exchange key label $K_R\_label$ from the RAC record (Step S1703).

Next, the server 201 acquires a limit time and date stored in a pair with the Sink-ID from the remote sink registry in the terminal management section 307 (Step S1704). It should be noted that when the limit time and date of each Sink-ID is managed by the management server on a cloud, for example, the server 201 accesses the management server via the communication controller 301 and acquires information on the relevant limit time and date.

Further, the server 201 acquires, from a file system, a recording time and date at/on which a content being requested by the content request (HTTP GET request) is recorded in the content recording section 302 (Step S1705). It should be noted that when the requested content is a content to be acquired by the content acquisition section 304 such as a broadcast content, an acquisition time and date and the current time and date (reception time and date) are acquired.

Then, the server 201 checks whether the recording time and date or acquisition time and date of the requested content has exceeded the limit time and date set for the Sink device (Step S1706).

When the content recording time and date or acquisition time and date has not exceeded the limit time and date of the Sink device (Yes in Step S1706), the server 201 permits the content request from the Sink device and transmits the requested content by, for example, the HTTP GET response in the next Step S1707.

Further, when the content recording time and date or acquisition time and date has exceeded the limit time and date of the Sink device (No in Step S1706), the server 201 does not permit the content request from the Sink device, skips the subsequent processing, and ends the processing routine.

As described above, by setting the limit time and date by adding the second predetermined period to the registration time and date of the terminal with respect to the server and restricting contents that the terminal can use by a remote access to only contents recorded before the limit time and date or contents acquired before the limit time and date, a use of a content by a third person exceeding a personal use range can be suitably suppressed.

It should be noted that the restriction of a remote access based on the limit time and date can be carried out in the content list viewing phase (SEQ801).

Figure 24:
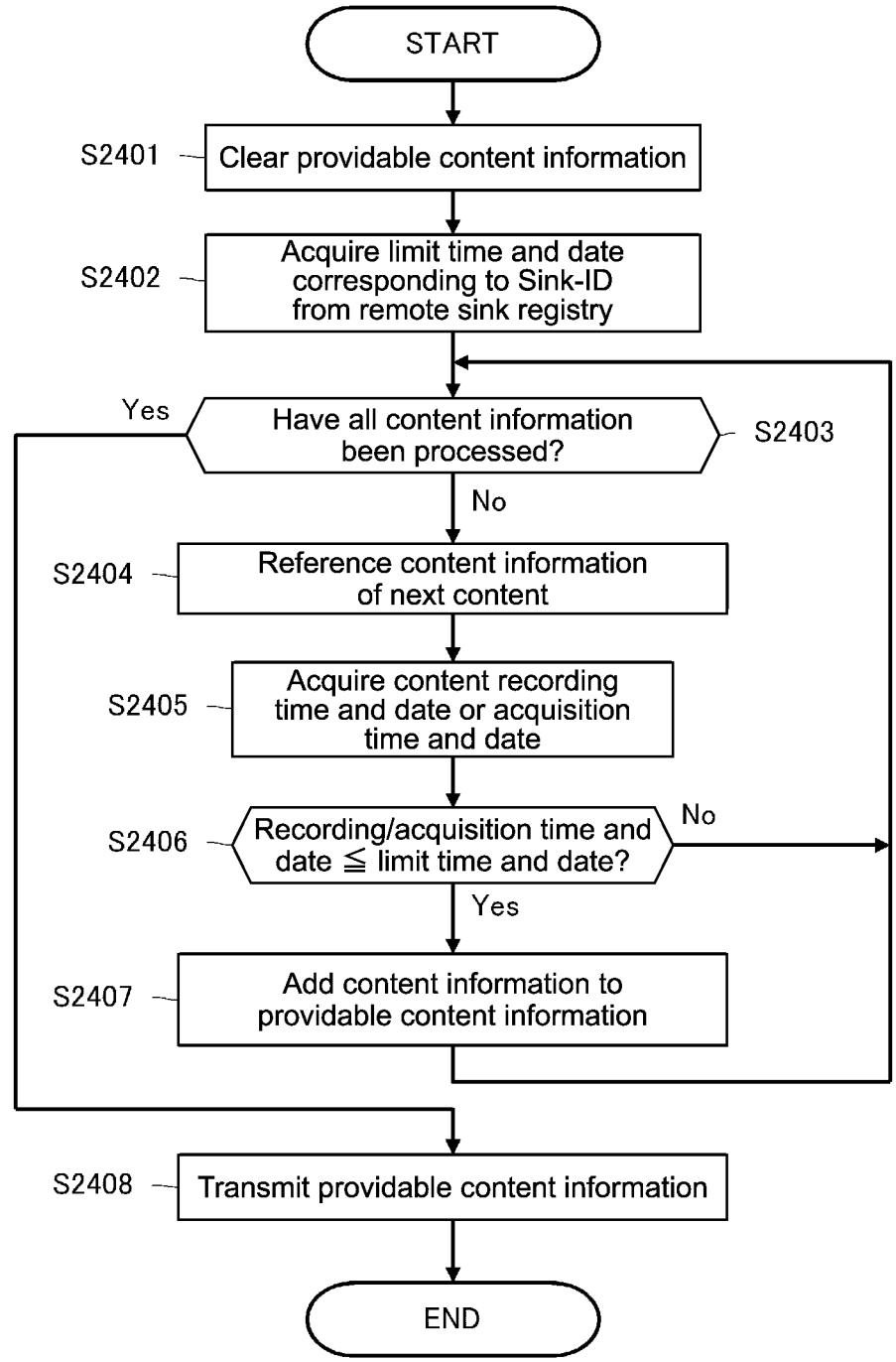
FIG. 24 is a flowchart showing a processing procedure for restricting provision of the CDS information based on the limit time and date of the Sink device performing a remote access.

FIG. 24 is a flowchart showing a processing procedure in which the Source device restricts, with respect to the Sink device that performs a remote access, provision of the CDS information based on the limit time and date of the Sink device in the content list viewing phase (SEQ801).

First, the Source device clears providable content information (Step S2401). Next, the Source device acquires, from the remote sink registry, the limit time and date corresponding to the Sink-ID of the request source Sink device (Step S2402).

Then, the Source device creates content information until all content information are processed (No in Step S2403). In other words, the Source device references content information of an unprocessed content (Step S2404) and acquires the recording time and date at/on which the content has been recorded in the content recording section 302 from the file system (Step S2405). It should be noted that when the requested content is a content to be acquired by the content acquisition section 304 such as a broadcast content, the current time and date (reception time and date) is acquired as the acquisition time and date.

Then, the Source device checks whether the content recording time and date or acquisition time and date has exceeded the limit time and date of the Sink device (Step S2406).

When the content recording time and date or acquisition time and date has not exceeded the limit time and date of the Sink device (Yes in Step S2406), the Source device adds the content information to providable content information (Step S2407). Then, the processing returns to Step S2403, and whether all content information have been processed is checked.

On the other hand, when the content recording time and date or acquisition time and date has exceeded the limit time and date of the Sink device (No in Step S2406), the Source device returns to Step S2403 without adding the content information to the providable content information, and whether all content information have been processed is checked.

When all content information have been processed (Yes in Step S2403), the Source device transmits the completed content information to the request source Sink device (Step S2408).

As described above, also by providing content information to the Sink device while placing a restriction to only contents recorded before the limit time and date or contents acquired before the limit time and date, a use of a content by a third person exceeding a personal use range can be suitably suppressed.

E. Easing of Restriction on Remote Access Based on Registration Time and Date

In the items C and D above, a remote access from the terminal 202 is restricted using the expiration date or limit time and date set based on the registration time and date at/on which the terminal 202 is registered in the server 201, to thus prevent a continuous use by a once-registered third person and suppress a content use exceeding a personal use range.

However, if a remote access restriction based on the registration time and date is placed on all terminals registered in the server 201, a valid content use by regular users (i.e., within personal use range) is unnecessarily restricted while a use by a third person can be suppressed, and thus there is a fear that the users may feel inconvenient. If the users feel inconvenient, the use of the communication system 200 will not prevail.

In this regard, a predetermined number of terminals registered in the server 201 may be exempted from being applied with the remote access restriction based on the registration time and date.

In this case, the RA-AKE procedure is carried out according to the procedure shown in FIG. 10 instead of that shown in FIG. 11, and a remote access exchange key $K_R$ and exchange key label $K_{R\_label}$ are distributed to all Sink devices without carrying out the registration deletion processing based on the expiration date. Then, in the procedure of registering the Sink device in the Source device (see FIGS. 6 and 13), for a predetermined number of terminals, a large value is set as the expiration date or the limit time and date, or a specific value indicating that the expiration date or limit time and date is exempted is set. With such a structure, in the content output management processing (see FIGS. 19 and 17) in the content transmission phase (see FIGS. 18 and 16), it is possible to avoid an application of the restriction based on the expiration date or the limit time and date in Steps S1905 and S1706.

By exempting the remote access restriction based on the registration time and date with respect to the server up to a predetermined number of terminals, the convenience of a content use within a personal use range can be secured.

Further, FIGS. 22 and 24 show a processing procedure for restricting, with respect to the Sink device that performs a remote access, provision of CDS information based on the expiration date or the limit time and date in the content list viewing phase (SEQ801). Also in this case, by providing CDS information without a restriction based on the registration time and date with respect to the server up to a predetermined number of terminals, the convenience of a content use within a personal use range can be secured.

Further, a terminal for which the application of the remote access restriction based on the registration time and date is to be exempted may be set for each content or content group recorded in the server 201.

For example, there are a method of selecting a terminal for which an application of a restriction is to be exempted from usable terminals registered in the terminal management section 307 (i.e., remote sink registry) when a user sets timer recording or makes a recording request with respect to the server 201, and a method of registering a Sink-ID of a terminal for which an application of a restriction is to be exempted for each user so as to automatically allocate application exemption to a terminal of a user who has set timer recording or recording request of a content. It should be noted that means for recognizing a user at this time includes, for example, a login ID with respect to the server 201, a user instruction, and a user recognition using a camera or a sensor.

When registering a terminal for which the restriction application is to be exempted for each content, the Sink-ID of the terminal is stored as metadata on each content. Further, when registering a terminal for which the restriction application is to be exempted for each content group, the Sink-ID of the terminal is stored as metadata on each content group.

When setting a terminal for which the remote access restriction application is to be exempted for each content or content group, the RA-AKE procedure is carried out according to the procedure shown in FIG. 10 instead of that shown in FIG. 11, and a remote access exchange key $K_R$ and exchange key label $K_{R\_label}$ thereof are distributed to all Sink devices without carrying out the registration deletion processing based on the expiration date. Then, in the content output management processing in the content transmission phase (see FIGS. 18 and 16), a content transmission to the terminal is controlled according to the remote access restriction application exemption set for each content or content group.

Figure 20:
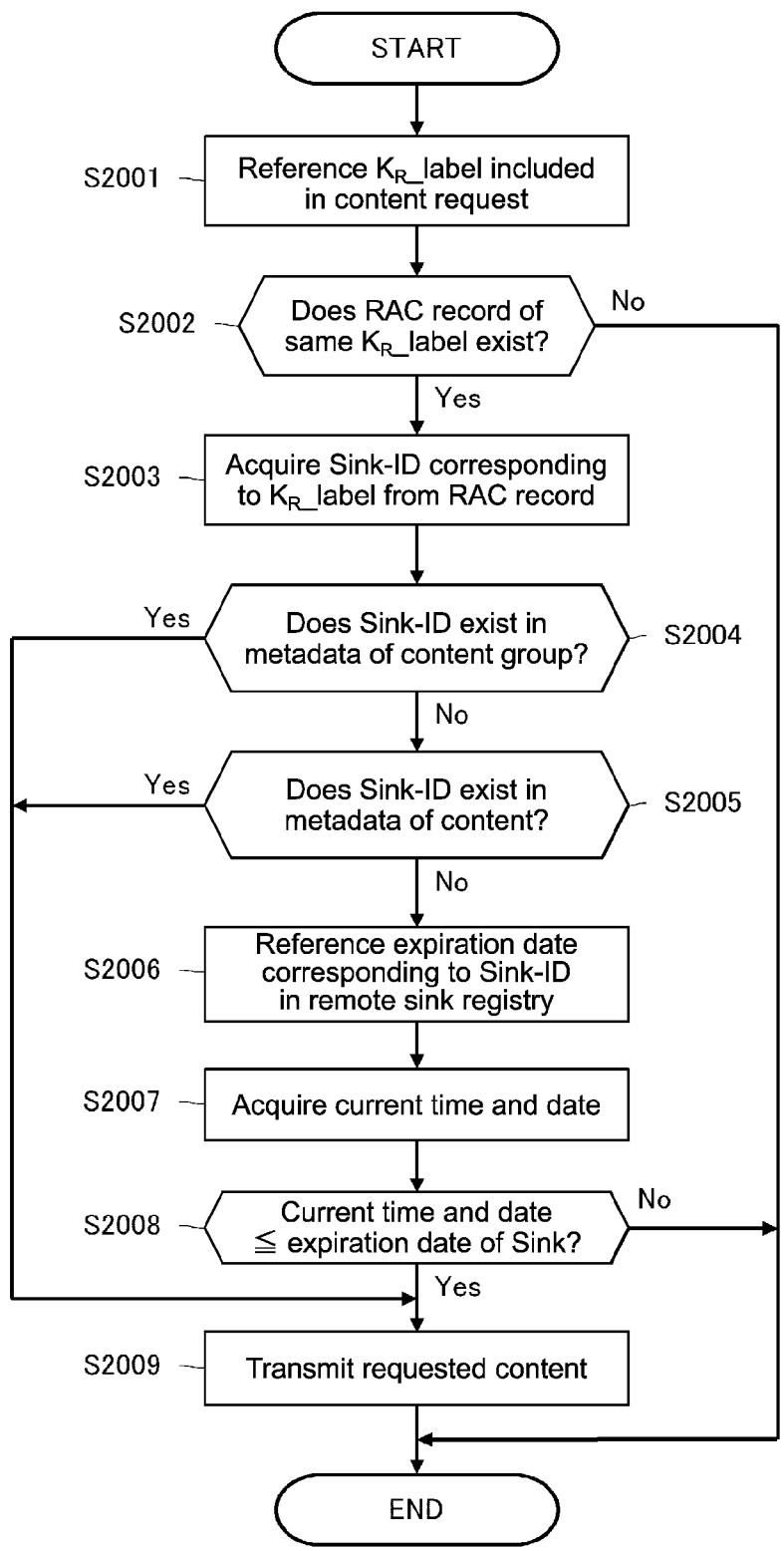
FIG. 20 is a flowchart showing the content output management processing procedure in a case where a terminal for which an application of a remote access restriction based on an expiration date is exempted is registered.

FIG. 20 is a flowchart showing the content output management processing procedure in a case where a terminal for which an application of a remote access restriction based on an expiration date is to be exempted is registered. In the descriptions below, for convenience, it is assumed that the content provision section 304 carries out the content output management processing in the server 201 as the Source device, for example.

The server 201 references an exchange key label $K_R\_label$ included in a content request (HTTP GET request) (Step S2001) and checks whether a RAC record of the same exchange key label $K_R\_label$ exists in the terminal management section 307 (Step S2002).

Here, when there is no RAC record of the same exchange key label $K_R\_label$ (No in Step S2002), it means that an illicit content request has been made due to the reason that the request source Sink device has not performed the RA-AKE procedure or the like. Then, the server 201 skips all subsequent processing and ends the processing routine.

On the other hand, when there is a RAC record of the same exchange key label $K_R\_label$ (Yes in Step S2002), the server 201 acquires the Sink-ID corresponding to the exchange key label $K_R\_label$ from the RAC record (Step S2003).

Next, the server 201 checks whether the Sink-ID exists in metadata of a requested content or content group, that is, whether it is a Sink-ID for which the remote access restriction application based on the expiration date is exempted with respect to the content group (Step S2004). Then, when the Sink-ID exists in the metadata of the content group (Yes in Step S2004), the server 201 permits the content request from the Sink device and transmits the requested content as an HTTP GET response, for example (Step S2009).

When the Sink-ID does not exist in the metadata of the content group (No in Step S2004), the server 201 checks whether the Sink-ID exists in metadata of a requested content, that is, whether it is a Sink-ID for which the remote access restriction application based on the expiration date is exempted with respect to the content (Step S2005). Then, when the Sink-ID exists in the metadata of the content (Yes in Step S2005), the server 201 permits the content request from the Sink device and transmits the requested content as an HTTP GET response, for example (Step S2009).

On the other hand, when the Sink-ID does not exist in the metadata of both the content group and the content, that is, the remote access restriction application based on the expiration date is not exempted (No in Steps S2004 and S2005), the expiration date stored in a pair with the Sink-ID is acquired from the remote sink registry in the terminal management section 307 (Step S2006).

Then, the server 201 acquires the current time and date (Step S2007) and checks whether the current time and date has exceeded the expiration date of the request source Sink device (Step S2008). When the current time and date has exceeded the expiration date (No in Step S2008), the processing routine is ended without transmitting a content.

On the other hand, when the current time and date has not exceeded the expiration date of the request source Sink device (Yes in Step S2008), the server 201 permits the content request from the Sink device and transmits the requested content as an HTTP GET response, for example (Step S2009).

It should be noted that the remote access restriction application exemption based on the expiration date can be carried out in the content list viewing phase (SEQ801).

Figure 23:
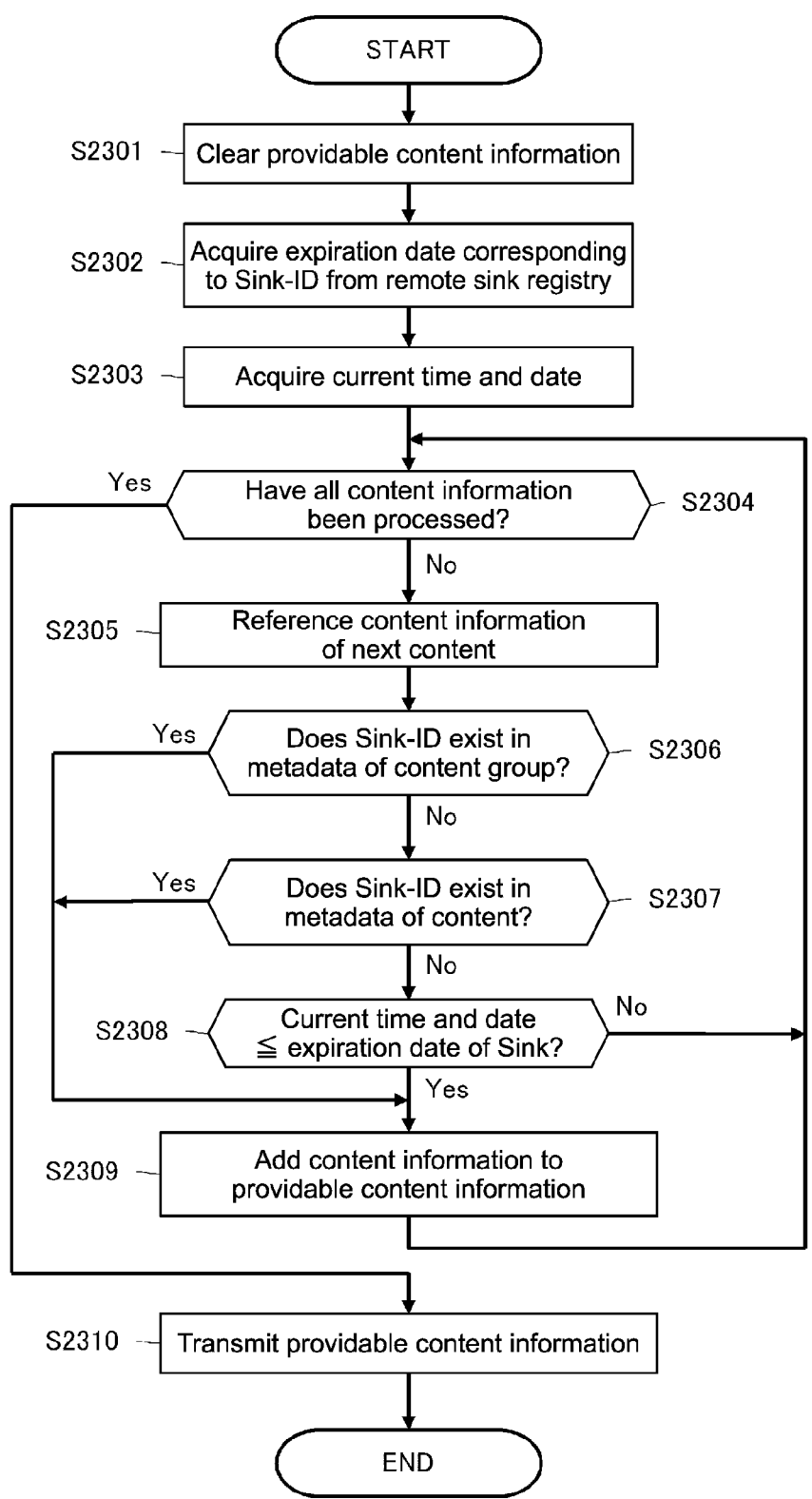
FIG. 23 is a flowchart showing a processing procedure for exempting the CDS information provision restriction based on the expiration date of the Sink device in the content list viewing phase.

FIG. 23 is a flowchart showing a processing procedure for the Source device to exempt, with respect to the Sink device that performs a remote access, the CDS information provision restriction based on the expiration date of the Sink device in the content list viewing phase (SEQ801).

First, the Source device clears providable content information (Step S2301).

Next, the Source device acquires an expiration date corresponding to the Sink-ID of the request source Sink device from the remote sink registry (Step S2302) and acquires the current time and date (Step S2303).

Then, the Source device creates content information until all content information are processed (No in Step S2304).

Upon referencing content information of an unprocessed content (Step S2305), the Source device checks whether the request source Sink-ID exists in metadata of a content group including the content, that is, whether it is a Sink-ID for which the remote access restriction application based on the expiration date is exempted with respect to the content group (Step S2306). Then, when the Sink-ID exists in the metadata of the content group (Yes in Step S2306), the Source device adds the content information referenced in Step S2305 to providable content information (Step S2309) and returns to Step S2304.

Further, when the Sink-ID does not exist in the metadata of the content group (No in Step S2306), the Source device checks whether the request source Sink-ID exists in metadata of the content, that is, whether it is a Sink-ID for which the remote access restriction application based on the expiration date is exempted with respect to the content (Step S2307). Then, when the Sink-ID exists in the metadata of the content (Yes in Step S2307), the Source device adds the content information referenced in Step S2305 to providable content information (Step S2309) and returns to Step S2304.

On the other hand, when the Sink-ID does not exist in the metadata of both the content group and the content, that is, the remote access restriction application based on the expiration date is not exempted (No in Steps S2306 and S2307), the Source device checks whether the current time and date acquired in Step S2303 has exceeded the expiration date of the request source Sink device (Step S2308).

Here, when the current time and date has not exceeded the expiration date (Yes in Step S2308), the Source device adds the content information referenced in Step S2305 to providable content information (Step S2309) and returns to Step S2304.

On the other hand, when the current time and date has exceeded the expiration date (No in Step S2308), the processing returns to Step S2304 without adding the content information referenced in Step S2305 to the providable content information.

Then, when all content information are processed (Yes in Step S2304), the Source device transmits the completed content information to the request source Sink device (Step S2310).

Figure 21:
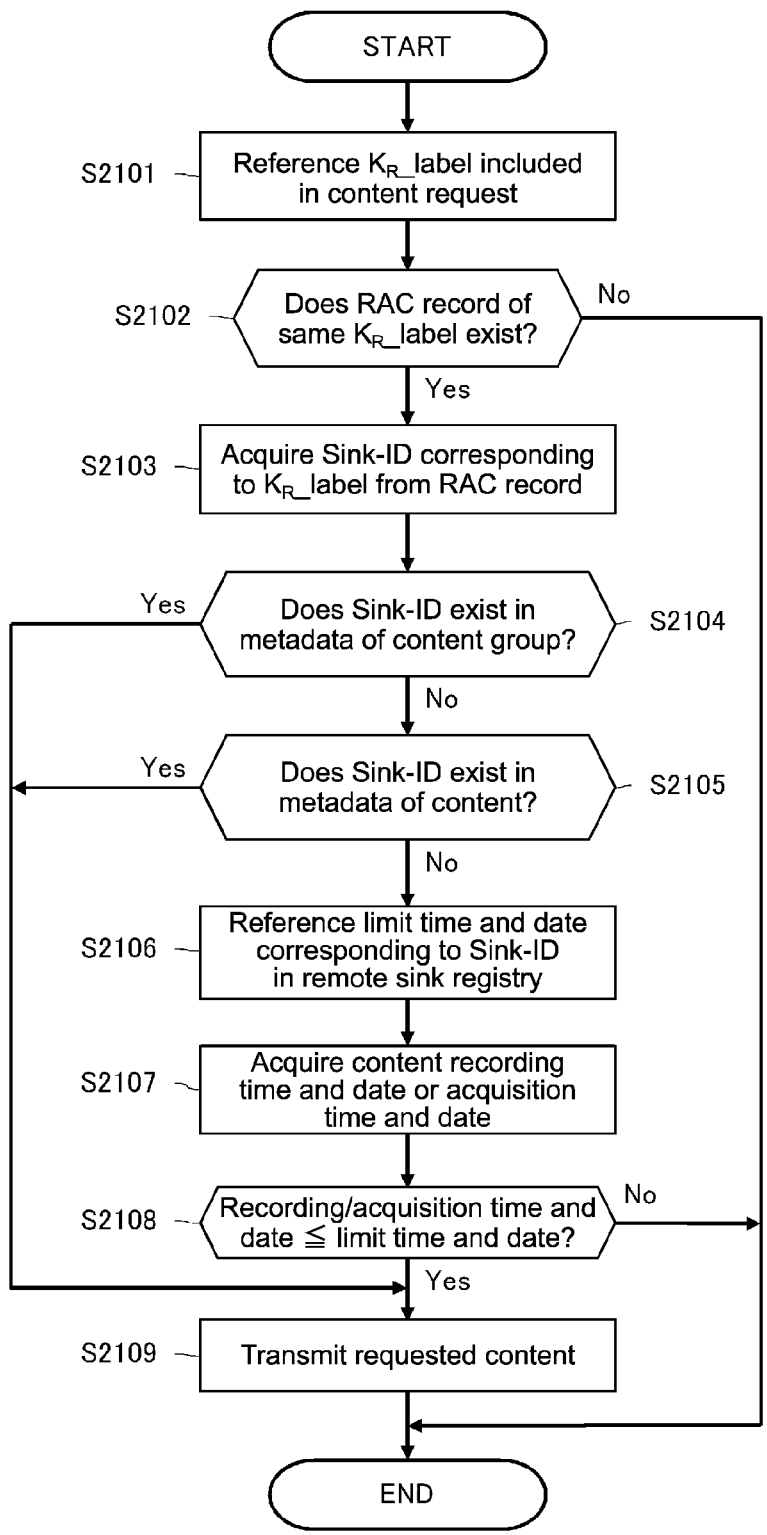
FIG. 21 is a flowchart showing the content output management processing procedure in a case where a terminal for which an application of a remote access restriction based on a limit time and date is exempted is registered.

FIG. 21 is a flowchart showing the content output management processing procedure in a case where a terminal for which an application of a remote access restriction based on the limit time and date is to be exempted is registered. In the descriptions below, for convenience, it is assumed that the content provision section 304 carries out the content output management processing in the server 201 as the Source device, for example.

The server 201 references an exchange key label $K_R\_label$ included in a content request (HTTP GET request) (Step S2101) and checks whether a RAC record of the same exchange key label $K_R\_label$ exists in the terminal management section 307 (Step S2102).

When there is no RAC record of the same exchange key label $K_R\_label$ (No in Step S2102), the server 201 skips all subsequent processing and ends the processing routine.

On the other hand, when there is a RAC record of the same exchange key label $K_R\_label$ (Yes in Step S2102), the server 201 acquires the Sink-ID corresponding to the exchange key label $K_R\_label$ from the RAC record (Step S2103).

Next, the server 201 checks whether the Sink-ID exists in metadata of a content group including the requested content, that is, whether it is a Sink-ID for which the remote access restriction application based on the limit time and date is exempted with respect to the content group (Step S2104). Then, when the Sink-ID exists in the metadata of the content group (Yes in Step S2104), the server 201 permits the content request from the Sink device and transmits the requested content as an HTTP GET response, for example (Step S2109).

When the Sink-ID does not exist in the metadata of the content group (No in Step S2104), the server 201 checks whether the Sink-ID exists in metadata of the requested content, that is, whether it is a Sink-ID for which the remote access restriction application based on the limit time and date is exempted with respect to the content (Step S2105). Then, when the Sink-ID exists in the metadata of the content (Yes in Step S2105), the server 201 permits the content request from the Sink device and transmits the requested content as an HTTP GET response, for example (Step S2109).

On the other hand, when the Sink-ID does not exist in the metadata of both the content group and the content, that is, the remote access restriction application based on the limit time and date is not exempted (No in Steps S2104 and S2105), the limit time and date stored in a pair with the Sink-ID is acquired from the remote sink registry in the terminal management section 307 (Step S2106).

Further, the server 201 acquires a recording time and date at/on which the requested content is recorded in the content recording section 302 from the file system (Step S2107). It should be noted that when the requested content is a content to be acquired by the content acquisition section 304 such as a broadcast content, the current time and date (reception time and date) is acquired as the acquisition time and date.

Then, the server 201 checks whether the recording time and date or acquisition time and date of the requested content has exceeded the limit time and date set for the Sink device (Step S2108).

When the content recording time and date or acquisition time and date has not exceeded the limit time and date of the Sink device (Yes in Step S2108), the server 201 permits the content request from the Sink device and transmits the requested content as, for example, the HTTP GET response in the next Step S2109.

Further, when the content recording time and date or acquisition time and date has exceeded the limit time and date of the Sink device (No in Step S2108), the server 201 does not permit the content request from the Sink device, skips the subsequent processing, and ends the processing routine.

It should be noted that the remote access restriction application exemption based on the limit time and date can be carried out in the content list viewing phase (SEQ801).

Figure 25:
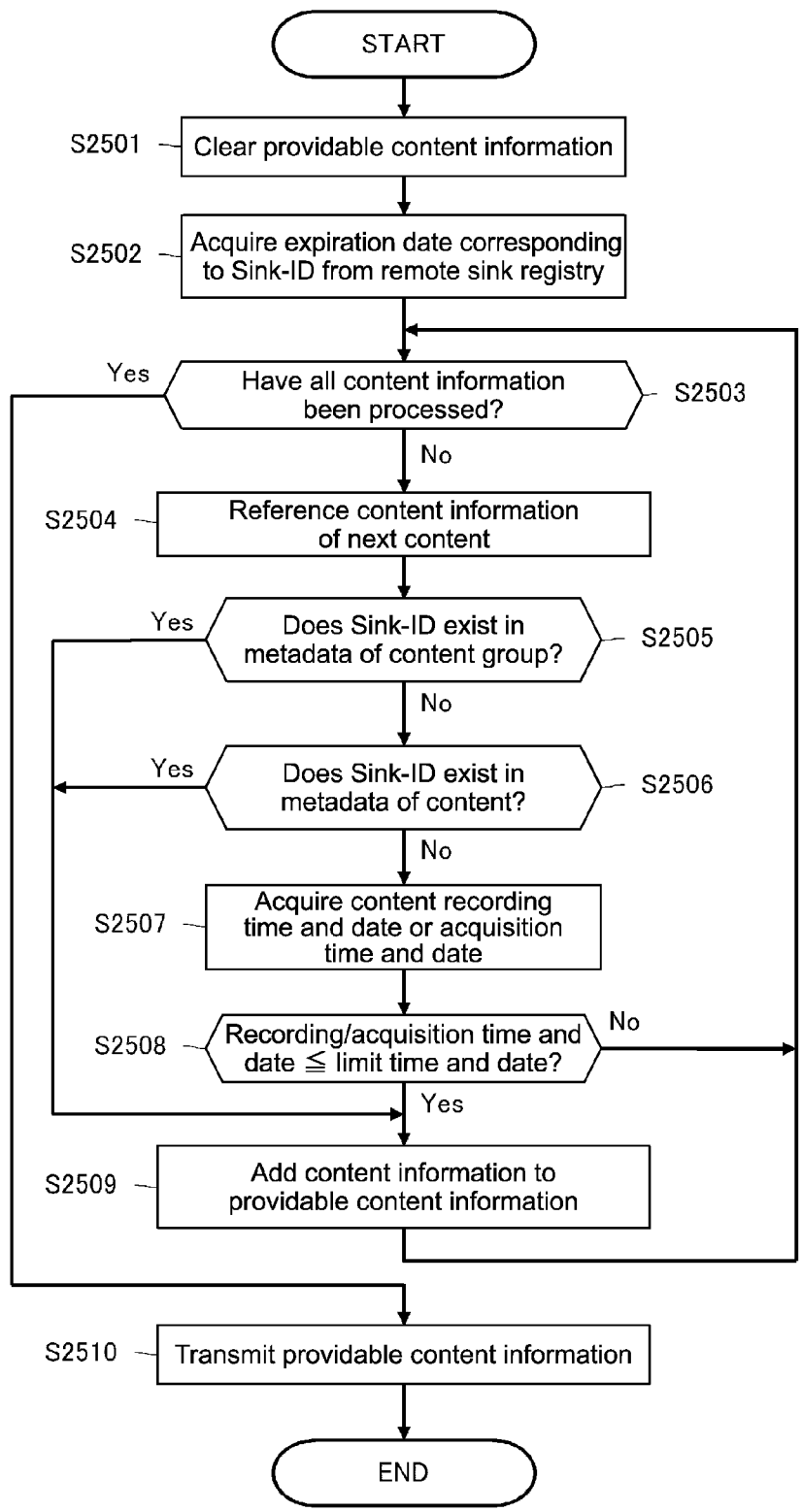
FIG. 25 is a flowchart showing a processing procedure for exempting the CDS information provision restriction based on the limit time and date of the Sink device in the content list viewing phase.

FIG. 25 is a flowchart showing a processing procedure for exempting, with respect to the Sink device that performs a remote access, the CDS information provision restriction based on the limit time and date of the Sink device in the content list viewing phase (SEQ801).

First, the Source device clears providable content information (Step S2501). Next, the Source device acquires a limit time and date corresponding to the Sink-ID of the request source Sink device from the remote sink registry (Step S2502).

Then, the Source device creates content information until all content information are processed (No in Step S2503).

Upon referencing content information of an unprocessed content (Step S2504), the Source device checks whether the request source Sink-ID exists in metadata of a content group including the content, that is, whether it is a Sink-ID for which the remote access restriction application based on the limit time and date is exempted with respect to the content group (Step S2505). Then, when the Sink-ID exists in the metadata of the content group (Yes in Step S2505), the Source device adds the content information referenced in Step S2504 to providable content information (Step S2509) and returns to Step S2503.

Further, when the Sink-ID does not exist in the metadata of the content group (No in Step S2505), the Source device checks whether the request source Sink-ID exists in metadata of the content, that is, whether it is a Sink-ID for which the remote access restriction application based on the limit time and date is exempted with respect to the content (Step S2506). Then, when the Sink-ID exists in the metadata of the content (Yes in Step S2506), the Source device adds the content information referenced in Step S2504 to providable content information (Step S2509) and returns to Step S2503.

On the other hand, when the Sink-ID does not exist in the metadata of both the content group and the content, that is, the remote access restriction application based on the limit time and date is not exempted (No in Steps S2505 and S2506), the Source device checks whether the content information referenced in Step S2504 has exceeded the limit time and date.

For checking the limit time and date, the Source device acquires the recording time and date at/on which the content is recorded in the content recording section 302 from the file system (Step S2507). It should be noted that when the requested content is a content to be acquired by the content acquisition section 304 such as a broadcast content, the current time and date (reception time and date) is acquired as the acquisition time and date. Then, the Source device checks whether the content recording time and date or acquisition time and date has exceeded the limit time and date of the Sink device (Step S2508).

When the content recording time and date or acquisition time and date has not exceeded the limit time and date of the Sink device (Yes in Step S2508), the Source device adds the content information to providable content information (Step S2509) and returns to Step S2503.

On the other hand, when the content recording time and date or acquisition time and date has exceeded the limit time and date of the Sink device (No in Step S2508), the Source device returns to Step S2503 without adding the content information to the providable content information.

When all content information have been processed (Yes in Step S2503), the Source device transmits the completed content information to the request source Sink device (Step S2510).

As shown in FIGS. 20, 21, 23, and 25, by setting a terminal for which the remote access restriction based on the registration time and date with respect to the server is to be exempted for each content or content group instead of exempting the remote access restriction with respect to a specific terminal, a convenience of a use of contents within a personal use range by a plurality of terminals of family members can be secured, for example.

INDUSTRIAL APPLICABILITY

Heretofore, the technique disclosed in the specification has been described in detail with reference to the specific embodiment. However, the embodiment can of course be modified or replaced without departing from the gist of the technique disclosed in the specification.

In the specification, the embodiment in which the technique disclosed in the specification is applied to an IP network and a network conforming to a DTCP specification has mainly been described. However, the gist of the technique disclosed in the specification is not limited thereto. The technique disclosed in the specification is also applicable to various communication systems in which a restriction is placed on a remote access with respect to contents in a home network in addition to DTCP-IP.

Moreover, an applicable range of the technique disclosed in the specification is not limited to the remote access with respect to a home network. When wishing to restrict an access based on a registration time and date of a terminal with respect to a home server also in a local access within a home network, the technique disclosed in the specification can similarly be applied.

In short, the technique disclosed in the specification has been described as an example, and the descriptions of the specification should not be interpreted limitedly. For judging the gist of the technique disclosed in the specification, the scope of claims should also be taken into consideration.

It should be noted that the technique disclosed in the specification may also take the following structures.

(1) A communication apparatus, including:
a content acquisition section that acquires a content to be provided to a terminal or a content recording section that records the content to be provided to the terminal;
a terminal registration section that registers a terminal to which a content is to be provided; and
a content provision section that controls provision of a content to the terminal based on a registration time and date of the terminal.

(2) The communication apparatus according to (1) above, further including
an authentication and key sharing section that authenticates a terminal and shares an exchange key according to a predetermined mutual authentication and key exchange procedure,
in which the content provision section provides a content encrypted using the exchange key to the terminal.

(3) The communication apparatus according to (2) above,
in which the authentication and key sharing section performs mutual authentication and sharing of the exchange key with the terminal according to an authentication and key exchange (AKE) algorithm defined by DTCP-IP, and
in which the terminal registration section registers the terminal according to a procedure defined by DTCP-IP.

(4) The communication apparatus according to (1) above,
in which the terminal registration section registers the terminal in a home network, and
in which the content provision section provides a content to the registered terminal accessing from an external network.

(5) The communication apparatus according to (1) above,
in which the terminal registration section manages an expiration date obtained by adding a first predetermined period to the registration time and date of the terminal together with terminal information, and
in which the content provision section restricts provision of a content to the terminal that has exceeded the expiration date.

(6) The communication apparatus according to (1) above,
in which the terminal registration section manages a limit time and date obtained by adding a second predetermined period to the registration time and date of the terminal together with terminal information, and
in which the content provision section restricts provision of a content to the terminal, the content having an acquisition time and date of the content acquisition section or a recording time and date with respect to the content recording section on or after the limit time and date.

(7) The communication apparatus according to (1) above,
in which the content provision section provides a content while exempting a restriction based on the registration time and date for a predetermined number of terminals registered in the terminal registration section.

(8) The communication apparatus according to (1) above,
in which a terminal for which a restriction based on the registration time and date is to be exempted is set for each content or content group, and
in which the content provision section provides, irrespective of the registration time and date, a content to the terminal for which the restriction based on the registration time and date has been exempted regarding a content to be provided or a content group including the content.

(9) The communication apparatus according to (8) above,
in which the content recording section records the terminal for which the restriction based on the registration time and date has been exempted regarding a content to be provided or a content group including the content into metadata of the content or content group.

(10) The communication apparatus according to (5) above,
in which a terminal for which a restriction based on the expiration date is to be exempted is set for each content or content group, and
in which the content provision section provides, irrespective of the expiration date, a content to the terminal for which the exemption has been set regarding a content to be provided or a content group including the content.

(11) The communication apparatus according to (6) above,
in which a terminal for which a restriction based on the limit time and date is to be exempted is set for each content or content group, and
in which the content provision section provides, irrespective of the limit time and date, a content to the terminal for which the exemption has been set regarding a content to be provided or a content group including the content.

(12) The communication apparatus according to (1) above, further including
a content information provision section that provides, to the terminal, information on a content that can be provided to the terminal,
in which the content provision section provides a content selected via content information viewed on the terminal side.

(13) The communication apparatus according to (12) above,
in which the content information provision section restricts provision of the content information to the terminal based on the registration time and date of the terminal.

(14) The communication apparatus according to (13) above,
in which the terminal registration section manages an expiration date obtained by adding a first predetermined period to the registration time and date of the terminal together with terminal information, and in which the content information provision section restricts provision of the content information to the terminal that has exceeded the expiration date.

(15) The communication apparatus according to (13) above, in which the terminal registration section manages a limit time and date obtained by adding a second predetermined period to the registration time and date of the terminal together with terminal information, and in which the content information provision section restricts provision of the content information to the terminal, the content having an acquisition time and date of the content acquisition section or a recording time and date with respect to the content recording section on or after the limit time and date.

(16) The communication apparatus according to (13) above, in which the content information provision section provides the content information while exempting a restriction based on the registration time and date for a predetermined number of terminals registered in the terminal registration section.

(17) The communication apparatus according to (14) above, in which a terminal for which a restriction based on the expiration date is to be exempted is set for each content or content group, and in which the content information provision section provides to the terminal, irrespective of whether the terminal has exceeded the expiration date, a content included in a content group for which the exemption has been set with respect to the terminal or content information of a content for which the exemption has been set.

(18) The communication apparatus according to (15) above, in which a terminal for which a restriction based on the limit time and date is to be exempted is set for each content or content group, and in which the content information provision section provides, irrespective of whether the acquisition time and date or the recording time and date has exceeded the limit time and date, the content information regarding a content or content group for which the exemption has been set with respect to a terminal as a provision destination.

(19) A communication method, including:

a content acquisition step of acquiring a content to be provided to a terminal or a content recording step of recording the content to be provided to the terminal in a content recording section;

a terminal registration step of registering a terminal to which a content is to be provided; and a content provision step of providing, to the terminal, a content acquired in the content acquisition step or a content recorded in the content recording step while placing a restriction based on a registration time and date of the terminal.

(20) A computer program described in a computer-readable format to cause a computer to function as:

a content acquisition section that acquires a content to be provided to a terminal or a content recording section that records the content to be provided to the terminal;

a terminal registration section that registers a terminal to which a content is to be provided; and a content provision section that controls provision of a content to the terminal based on a registration time and date of the terminal.

(21) A communication apparatus, including:

an input section to which operation information of a user is input;

a registration request section that makes a registration request to a server managing a registration time and date;

a content request section that requests a content to the server according to the operation information input to the input section; and a content reproduction section that is permitted by the server to reproduce, in response to the request of a content, the content under a restriction based on the registration time and date.

(22) The communication apparatus according to (21) above, further including an authentication section that performs, as well as perform a registration in the server according to a procedure defined by DTCP-IP, mutual authentication and exchange key sharing with the server according to an authentication and key exchange (AKE) algorithm defined by DTCP-IP, in which the content reproduction section acquires a content encrypted using the exchange key from the server and decrypts and reproduces the content using the exchange key.

(23) The communication apparatus according to (21) above, in which the registration request section performs the registration in the server in a home network, and in which the content reproduction section acquires a content from the server via an external network.

(24) The communication apparatus according to (21) above, in which the registration request section performs registration request processing with respect to the server before a predetermined period elapses from the registration time and date.

(25) The communication apparatus according to (21) above, in which the content reproduction section reproduces a broadcast content received from the server, a commercial content read out from a recording medium, or a content recorded in the server.

(26) The communication apparatus according to (21) above, in which the content reproduction section is restricted to reproduce a content from the server after an expiration date obtained by adding a first predetermined period to the registration time and date with respect to the server.

(27) The communication apparatus according to (21) above, in which the content reproduction section is restricted to reproduce a content that the server has acquired or recorded after a time and date obtained by adding a second predetermined period to the registration time and date with respect to the server.

(28) The communication apparatus according to (21) above, in which the content reproduction section is capable of reproducing, when terminals are registered in the server within a predetermined number, a content from the server without being restricted based on the registration time and date with respect to the server.

(29) The communication apparatus according to (21) above, in which the content reproduction section is capable of reproducing, irrespective of the registration time and date, a content for which the restriction based on the registration time and date has been exempted with respect to the communication apparatus or a content included in a content group.

(30) The communication apparatus according to (26) above, in which the content reproduction section is capable of reproducing, irrespective of the set expiration date, a content for which the restriction based on the expiration date has been exempted with respect to the communication apparatus or a content included in a content group.

(31) The communication apparatus according to (27) above, in which the content reproduction section is capable of reproducing, irrespective of whether an acquisition time and date or recording time and date with respect to the server is before a limit time and date, a content for which a restriction based on the limit time and date has been exempted with respect to the communication apparatus or a content included in a content group.

(32) The communication apparatus according to (21) above, further including a content information viewing section that views information on a content that can be provided by the server, in which the content request section requests the server for a content selected via information viewed by the content information viewing section.

(33) The communication apparatus according to (32) above, in which the content information viewing section views information on a content that can be provided by the server under the restriction based on the registration time and date with respect to the server.

(34) The communication apparatus according to (32) above, in which the content information viewing section is restricted to view content information after an expiration date obtained by adding a first predetermined period to the registration time and date with respect to the server.

(35) The communication apparatus according to (32) above, in which the content information viewing section is restricted to view content information that has been acquired or recorded by the server after a time and date obtained by adding a second predetermined period to the registration time and date with respect to the server.

(36) The communication apparatus according to (33) above, in which the content information viewing section is capable of viewing, when terminals are registered in the server within a predetermined number, content information without being restricted based on the registration time and date with respect to the server.

(37) The communication apparatus according to (34) above, in which the content information viewing section is capable of viewing, irrespective of the set expiration date, content information included in a content or content group for which the restriction based on the expiration date has been exempted with respect to the communication apparatus.

(38) The communication apparatus according to (35) above, in which the content information viewing section is capable of viewing, irrespective of whether an acquisition time and date or recording time and date with respect to the server is before a limit time and date, content information included in a content or content group for which a restriction based on the limit time and date has been exempted with respect to the communication apparatus.

(39) A communication method, including:

an input step of inputting operation information of a user;

a registration request step of making a registration request to a server managing a registration time and date;

a content request step of requesting a content to the server according to the operation information input to the input section; and a content reproduction step of permitting by the server to reproduce, in response to the request of a content, the content under a restriction based on the registration time and date.

(40) A computer program described in a computer-readable format to cause a computer to function as:

an input section to which operation information of a user is input;

a registration request section that makes a registration request to a server managing a registration time and date;

a content request section that requests a content to the server according to the operation information input to the input section; and a content reproduction section that is permitted by the server to reproduce, in response to the request of a content, the content under a restriction based on the registration time and date.

(41) A communication system, including:

a terminal that requests a content; and a server that controls, as well as register a terminal to which a content is to be provided, provision of a content to the terminal based on a registration time and date.

DESCRIPTION OF REFERENCE NUMERALS 100 communication system
101 server
102 terminal
110 home network
201 server
202 terminal
200 communication system
201 server
202 terminal
210 home network
220 external network
230 router
300 communication apparatus (Source device)
301 communication controller
302 content recording section
303 content acquisition section
304 content provision section
305 content list provision section
306 authentication/key sharing section
307 terminal management section
400 communication apparatus
401 communication controller
402 content list viewing section
403 content acquisition section
404 content decryption section
405 content reproduction output section
406 authentication/key sharing section
407 input section

The invention claimed is:

1. A communication apparatus, comprising:
a tuner;
a content storage; and
a controller configured to:
acquire content from the tuner, for one of provide the content to a terminal or record the content to the content storage;
register the terminal, in association with a registration date, to a home network,
wherein the terminal requests for the content from outside the home network; and
provide the content to the registered terminal based on a request, from the registered terminal, for the content,
wherein the provide the content to the registered terminal is based on the request, before an expiration date, for the content,
wherein the expiration date is based on the registration date of the registered terminal, and wherein the provide the content to the registered terminal is restricted based on the request, after the expiration date, for the content.

2. The communication apparatus according to claim 1, wherein the controller is further configured to:
authenticate the terminal and share an exchange key based on a mutual authentication and key exchange procedure,
wherein the content provided to the registered terminal is content encrypted based on the exchange key to the terminal.

3. The communication apparatus according to claim 2, wherein the authentication and the share of the exchange key with the terminal is based on an authentication and key exchange (AKE) algorithm defined by a Digital Transmission Content Protection mapping to an Internet Protocol (DTCP-IP), and
wherein the registration of the terminal is based on a procedure defined by the DTCP-IP.

4. The communication apparatus according to claim 1, wherein the controller is further configured to manage the expiration date and terminal information, wherein the expiration date is obtained by addition of a first period to at least one of the registration date or a registration time of the terminal.

5. The communication apparatus according to claim 1, wherein the controller is further configured to:
manage at least one of a limit time or a limit date, obtained by addition of a second period to at least one of a registration time and the registration date of the terminal, with terminal information, and
restrict the provide of the content to the terminal, based on one of the acquisition or the record the content on or after at least one of the limit time or the limit date.

6. The communication apparatus according to claim 1, wherein the controller is further configured to provide the content with an exemption of a restriction based on at least one of a registration time or the registration date for a number of terminals in a plurality of the registered terminals.

7. The communication apparatus according to claim 1, wherein at least one terminal of a plurality of the registered terminals is exempted from the restriction based on a registration time and the registration date,
wherein the at least one terminal of the plurality of registered terminals is set for one of the content or a content group that comprises the content, and
wherein the controller is further configured to provide the content to the terminal exempted from the restriction.

8. The communication apparatus according to claim 7, wherein the controller is further configured to record the at least one terminal exempted from the restriction, into metadata of the content or the content group.

9. The communication apparatus according to claim 1, wherein at least one terminal of a plurality of the registered terminals is exempted from the restriction based on the expiration date,
wherein the exempted at least one terminal of the plurality of registered terminals is set for one of the content or a content group that comprises the content, and
wherein the controller is further configured to provide the content, irrespective of the expiration date, to the exempted at least one terminal.

10. The communication apparatus according to claim 1, wherein at least one terminal of plurality of the registered terminals is exempted from the restriction based on at least one of the limit time or the limit date,
wherein the exempted at least one terminal is set for the content or a content group that comprises the content, and
wherein the controller is further configured to provide the content to the exempted at least one terminal.

11. A communication method, comprising:
acquiring content from a tuner, for one of providing the content to a terminal or recording the content to a content storage;
registering the terminal, in association with a registration date, to a home network,
wherein the terminal requests for the content from outside the home network; and
providing the content to the registered terminal based on a request, from the registered terminal, for the content,
wherein the providing the content to the registered terminal is based on the request, before an expiration date, for the content,
wherein the expiration date is based on the registration date of the registered terminal, and
wherein the providing the content to the registered terminal is restricted based on the request, after the expiration date, for the content.

12. A non-transitory computer-readable storage medium having stored thereon computer-executable instructions that, when executed by a processor, cause a computer to execute operations, the operations comprising:
acquiring content from a tuner, for one of providing the content to a terminal or recording the content to a content storage;
registering the terminal in association with a registration date, to a home network,
wherein the terminal requests for the content from outside the home network; and
providing the content to the registered terminal based on a request, from the registered terminal, for the content,
wherein the providing the content to the registered terminal is based on the request, before an expiration date, for the content,
wherein the expiration date is based on the registration date of the registered terminal, and
wherein the providing the content to the registered terminal is restricted based on the request, after the expiration date, for the content.

* * * * *